United States Patent
Hu et al.

(10) Patent No.: US 12,122,708 B2
(45) Date of Patent: Oct. 22, 2024

(54) MOTHER GLASS, REINFORCED GLASS AND PREPARATION METHOD

(71) Applicant: Chongqing Aureavia Hi-tech Glass Co., Ltd., Chongqing (CN)

(72) Inventors: Wei Hu, Guangdong (CN); Baoquan Tan, Guangdong (CN); Fanghua Chen, Guangdong (CN)

(73) Assignee: Chongqing Aureavia Hi-tech Glass Co., Ltd., Chongqing (CN)

( * ) Notice: Subject to any disclaimer, the term of this patent is extended or adjusted under 35 U.S.C. 154(b) by 1108 days.

(21) Appl. No.: 16/959,139

(22) PCT Filed: Jan. 31, 2018

(86) PCT No.: PCT/CN2018/074636
§ 371 (c)(1),
(2) Date: Jun. 29, 2020

(87) PCT Pub. No.: WO2019/127818
PCT Pub. Date: Jul. 4, 2019

(65) Prior Publication Data
US 2020/0339471 A1   Oct. 29, 2020

(30) Foreign Application Priority Data
Dec. 29, 2017   (CN) .......................... 201711487372.1

(51) Int. Cl.
| C03C 4/18 | (2006.01) |
| C03C 3/085 | (2006.01) |
| C03C 3/087 | (2006.01) |
| C03C 3/097 | (2006.01) |
| C03C 21/00 | (2006.01) |

(52) U.S. Cl.
CPC ............ *C03C 21/002* (2013.01); *C03C 3/085* (2013.01); *C03C 3/087* (2013.01); *C03C 3/097* (2013.01); *C03C 4/18* (2013.01); *C03C 21/005* (2013.01); *C03C 2204/00* (2013.01)

(58) Field of Classification Search
CPC ....... C03C 21/002; C03C 3/085; C03C 3/087; C03C 3/097; C03C 4/18; C03C 21/005; C03C 2204/00
See application file for complete search history.

(56) References Cited

U.S. PATENT DOCUMENTS

| 2014/0106150 A1* | 4/2014 | Decker | .................. C03C 17/42 |
| | | | 428/319.1 |
| 2015/0239776 A1* | 8/2015 | Amin | .................. G06F 1/1637 |
| | | | 428/220 |

FOREIGN PATENT DOCUMENTS

WO    2017126607 A1    7/2017

OTHER PUBLICATIONS

International Search Report of PCT Patent Application No. PCT/CN2018/074636 issued on Sep. 25, 2018.

* cited by examiner

*Primary Examiner* — Laura A Auer

(57) ABSTRACT

Disclosed is a mother glass. The mother glass has a thickness range of 0.4 mm-2.0 mm, the transmittance of light with wavelength of 550 nm to the mother glass is in a range of 86%-92.2%; the refraction coefficient of the mother glass is in a range of 1.48-1.54; and the alkali metal oxide content in the mother glass is 11 mol %-22 mol %, wherein the Na oxide content is 5 mol %-18 mol %, and the Al oxide content is 7 mol %-16 mol %. A reinforced glass prepared from the same mother glass and a preparation method therefore are also disclosed.

19 Claims, 8 Drawing Sheets

Concentration distribution curve of first ion (K ion) for the reinforced glass obtained in embodiment 1-7

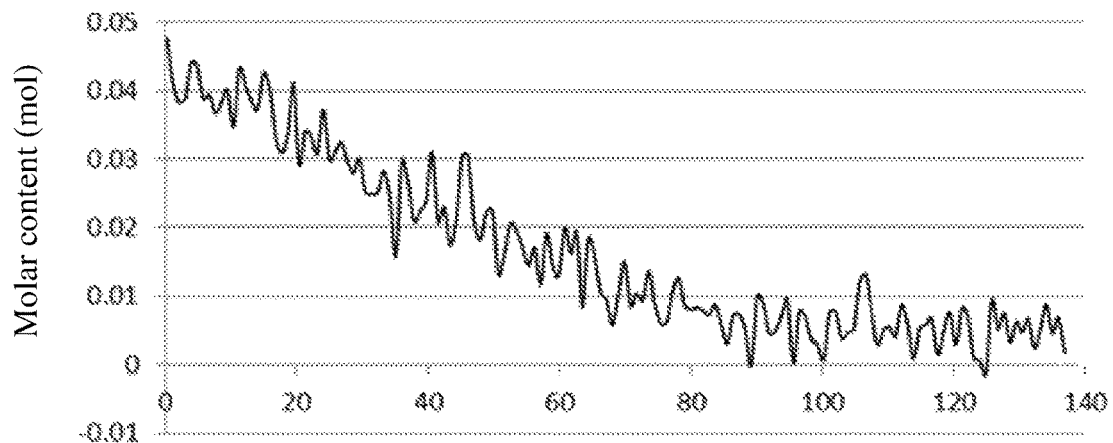

Distance extending from the surface of the reinforced glass to the interior of the reinforced glass (μm)

Fig.6

Concentration distribution curve of second ion ($Na^+$) for the reinforced glass obtained in embodiment 1-7

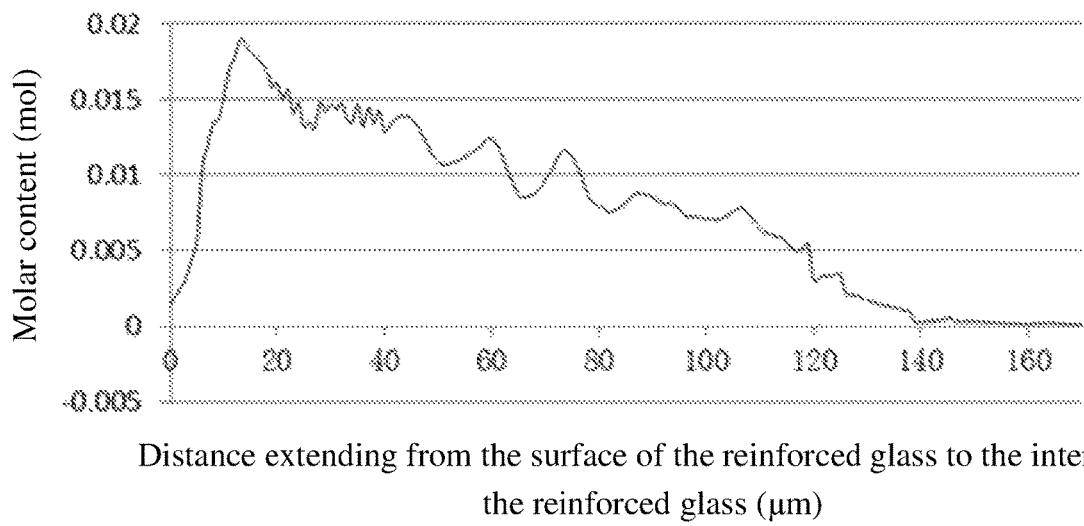

Distance extending from the surface of the reinforced glass to the interior of the reinforced glass (μm)

Fig.7

Fitting curve of compressive stress distribution for the reinforced glass obtained in embodiment 3-7

MOTHER GLASS, REINFORCED GLASS AND PREPARATION METHOD

TECHNICAL FIELD

The present disclosure relates generally to a glass production field, and more particularly relates to a mother glass, reinforced glass and preparation method.

BACKGROUND

Chemically reinforced glass is widely used in mobile phones, media players and other terminals due to its high transparency, high strength and high wear resistance. The high strength of the chemically reinforced glass is achieved by the ion exchange. The principle is that the smaller ions in the glass can be replaced with the larger ions in the salt bath at a high temperature. After the replacement, the larger ions accumulate closely on the surface of the glass and generate a strong compressive stress, thus showing a higher strength.

However, in the process of ion exchange, the larger ions in the salt bath will be diluted with the increase of the exchanged smaller ions, such that if the same salt bath is still used, the compressive stress of the glass will be reduced. In addition, the concentration of large ions on the shallow surface of the glass is too concentrated, and the concentrated large ions will prevent the glass from the fully exchange for obtaining a deeper ion exchange layer. However, when the ion exchange is forced to be implemented for a long-term, the inner tensile stress of the glass would be too excessive, which will result in the decrease of the glass safety. In order to solve this kind of technical problem, there is a way to realize the ion exchange through two different salt bath solutions. Firstly, the glass is placed into a first salt bath solution for the ion exchange. When the larger ions in the first salt bath solution is diluted to a certain extent, the glass is taken out for cooling and drying, and then placed into a second salt bath solution again for the ion exchange. Among which, the concentration of the larger ions in the second salt bath solution is higher than that in the first diluted salt bath. The stress distribution of the compressive stress layer formed by this salt bath treatment is as follows. The compressive stress layer does not change much in the depth direction, and the compressive stress layer is a continuous single-layer structure. The concentration distribution of the larger ions changes along with the depth of the glass as follows. The concentration of the larger ion is only higher near the surface of the glass, while the concentration of the larger ion in the glass will drop sharply. This will inevitably result in the uneven stress distribution of the compressive stress layer of the final reinforced glass.

In a word, up to now, no matter the single-layer structured compressive stress layer at the glass surface is formed by physical tempering or chemical strengthening for a single time of processing or multiple times of processing, its stress distribution or the concentration of the exchanged ions decreases sharply along the direction inward from the glass surface, resulting in that the compressive stress layer does not change much in the depth direction, and the overall strength of the glass cannot be improved.

Aiming at the technical problem that the mechanical properties of the existing reinforced glass need to be improved, the applicant reasonably designs the content ratio of the components in the mother glass, and enables the components to play a cooperative role and cooperate with each other, so that the mother glass obtained has the advantages of high refractive index, high 550 nm-wavelength light transmittance and good chemical strengthening effect, thus promoting the study and application of the chemical reinforced glass.

In addition, the present disclosure has also disclosed a reinforced glass prepared from the mother glass and the preparation method of the reinforced glass.

SUMMARY

The objective of the present disclosure is to provide a mother glass having a high refractive index, high 550 nm-wavelength light transmittance and good chemical strengthening effect, aiming at the above problems of the prior art. The present disclosure has further provided a reinforced glass with composite compressive stress layer and high overall strength prepared from the mother glass and a preparation method of the reinforced glass.

According to an aspect, the present disclosure has provided a mother glass having a thickness range of 0.4 mm-2.0 mm, a transmittance range for a 550 nm-wavelength light of 86%-92.2%, a refractive index range of 1.48-1.54, and an alkali metal oxide molar content range of 8 mol %-22 mol %, wherein in the mother glass, a Na oxide molar content is 2.65 mol %-18 mol %, an Al oxide molar content is 6.5 mol %~15.5 mol %.

In the mother glass of the present application, a Li oxide molar content is not higher than 18 mol %; while a sum range of a B oxide molar content, a P oxide molar content and a Si oxide molar content is 61 mol %-73 mol %; wherein the Si oxide molar content is 58.00 mol %-70.85 mol %.

In the mother glass of the present application, the Si oxide molar content is 62.00 mol %-70.85 mol %.

In the mother glass of the present application, the Li oxide molar content is not higher than 12 mol %.

In the mother glass of the present application, the Li oxide molar content is larger than the Na oxide molar content.

In the mother glass of the present application, a ratio range between the Al oxide molar content and a sum of the Na oxide molar content and the Li oxide molar content is 0.3-1.88.

In the mother glass of the present application, a ratio range between a sum of the Al oxide molar content and the Mg oxide molar content, and a sum of the Na oxide molar content and the Li oxide molar content is 0.6-2.88.

In the mother glass of the present application, a ratio range between a sum of the Al oxide molar content, a Mg oxide molar content, the B oxide molar content and the P oxide molar content, and a sum of the Na oxide molar content and the Li oxide molar content is 0.6-3.0.

In the mother glass of the present application, a ratio range between a sum of the Al oxide molar content, the Mg oxide molar content, the B oxide molar content, the P oxide molar content and the Si oxide molar content, and a sum of the Na oxide molar content and the Li oxide molar content is 3.5-11.38.

Advantageously, the mother glass is amorphous and contains no nucleating agent.

Advantageously, the mother glass comprises a micro-nano crystal and a nucleating agent selected from at least one oxide of Ti, Zr, Cr, Li, Zn, Mg, Al, P, wherein the micro-nano crystal is formed by a heat treatment at a temperature higher than a softening point of the mother glass after a glass forming and before the ion exchange.

Advantageously, the mother glass is formed by an overflow down-drawing method, a narrow seam down-drawing method, a horizontal floating method, a calendering method or a casting molding method.

Advantageously, during the ion exchange process, an ion exchange layer depth of the mother glass increases with an extension of an ion exchange time, wherein a compression stress layer formed by the mother glass after the ion exchange has a maximum limit depth which increases with an increase of the thickness of the mother glass and has a maximum range of 50-300 μm.

In a further aspect, a reinforced glass is provided, which can bear a fracture energy larger than 18.67 joules per square meter ($J/m^2$) when the reinforced glass is impacted and broken by an external force, and can bear a free fall fracture energy larger than 2.94 joules per kilogram (J/kg) under a certain negative pressure; wherein the reinforced glass is formed by the above mother glass after a single time or multiple times of chemical strengthening, and the reinforced glass has a composite compressive stress layer on its surface;

wherein the composite compressive stress layer comprises a first ion which enters into the reinforced glass through a single time or multiple times of ion exchanges and is selected from an ion group of Na ion, K ion, Ru ion and CS ion, wherein a concentration of the first ion decreases nonlinearly from the surface of the reinforced glass to an interior of the reinforced glass; wherein a first fitting curve about the concentration of the first ion vs. a distance extending from the surface of the reinforced glass to the interior of the reinforced glass has at least one inflection point, wherein an absolute value of a curve slope on a left side of all the inflection points on the first fitting curve is greater than an absolute value of the curve slope on a right side of all the inflection points on the first fitting curve;

wherein a compressive stress of the composite compressive stress layer decreases nonlinearly from the surface of the reinforced glass to the interior of the reinforced glass, and the composite compressive stress layer has a compressive stress curve extending from the surface of the reinforced glass to the interior of the reinforced glass, wherein a second fitting curve having at least one inflection point is obtained from the compressive stress curve by using Orihara Pmc software; wherein an absolute value of a curve slope on a left side of all the inflection points on the second fitting curve is greater than an absolute value of the curve slope on a right side of all the inflection points on the second fitting curve;

wherein the compressive stress of the composite compressive stress layer has a maximum range between 600 MPa and 1100 MPa, and the composite compressive stress layer has a depth between 60 μm and 300 μm;

wherein the reinforced glass further has a tensile stress layer having a maximum tensile stress range between 40 MPa and 116.55 MPa, and the tensile stress stored in each unit volume of the reinforced glass is 20000-291375 $MN/m^3$;

the reinforced glass has a thickness between 0.4 mm and 2.0 mm;

a ratio between an absolute value of a difference between sizes of the mother glass and the reinforced glass in a same dimension, and a size of the mother glass in the corresponding dimension is between 0.05% and 0.15%.

In the reinforced glass of the present application, a definite integral of the second fitting curve in a range where the composite compressive stress layer locates is less than or equal to 55 kN/m.

In the reinforced glass of the present application, the composite compressive stress layer further comprises a second ion which enters into the reinforced glass through a single time or multiple times of ion exchanges; wherein a concentration of the second ion increases nonlinearly and then decreases nonlinearly from the surface of the reinforced glass to an interior of the reinforced glass.

In the reinforced glass of the present application, the second ion is selected from an ion group of Na ion, K ion, Ru ion and CS ion; wherein a same second ion exists in the mother glass, and a maximum depth of the second ion entering into the reinforced glass is greater than the depth of the composite compressive stress layer.

In the reinforced glass of the present application, the first ion and the second ion are K ion and Na ion respectively.

In the reinforced glass of the present application, the first ion and the second ion enter into the reinforced glass from the same salt bath during a single time of chemical strengthening.

In the reinforced glass of the present application, the first ion and the second ion are K ions, and the mother glass contains Na oxide and Al oxide.

In the reinforced glass of the present application, the mother glass simultaneously contains Na oxide, Li oxide and Al oxide.

Advantageously, the reinforced glasses formed by the mother glass after the ion exchanges under different conditions have different tensile stress layers, a range absolute value of a total tensile stress that can be accommodated in the reinforced glass is less than or equal to 42.08 kN/m and increases with the increase of the glass thickness.

In a further aspect, a preparation method for preparing the above reinforced glass is further provided, which comprising following step:

placing the above mother glass into a salt bath containing at least one of Na ion, K ion, Ru ion and Cs ion for multiple times of ion exchange.

The preparation method according to the present application further comprises following step:

heating a semi-finished glass obtained by a previous time of ion exchange, after a first time of ion exchange but before a last time of ion exchange.

In a further aspect, a preparation method for preparing the above reinforced glass is further provided, which comprising following step:

placing the above mother glass into a salt bath containing at least two of Na ion, K ion, Ru ion and Cs ion for a single time of ion exchange.

Compared with the prior art, the mother glass provided by the present application has the following beneficial effects Aiming at the technical problem that the mechanical properties of the existing reinforced glass need to be improved, the content ratio of the components in the mother glass is reasonably designed for enabling the components to play a cooperative role and cooperate with each other, so that the mother glass obtained has the advantages of high refractive index, high 550 nm-wavelength light transmittance and good chemical strengthening effect, thus promoting the study and application of the chemical reinforced glass.

BRIEF DESCRIPTION OF THE DRAWINGS

FIG. 6 shows the first fitting curve of the reinforced glass obtained in embodiment 1-7.

FIG. 7 shows the third fitting curve of the reinforced glass obtained in embodiment 1-7.

DETAILED DESCRIPTION OF THE PREFERRED EMBODIMENT

Figure 1:
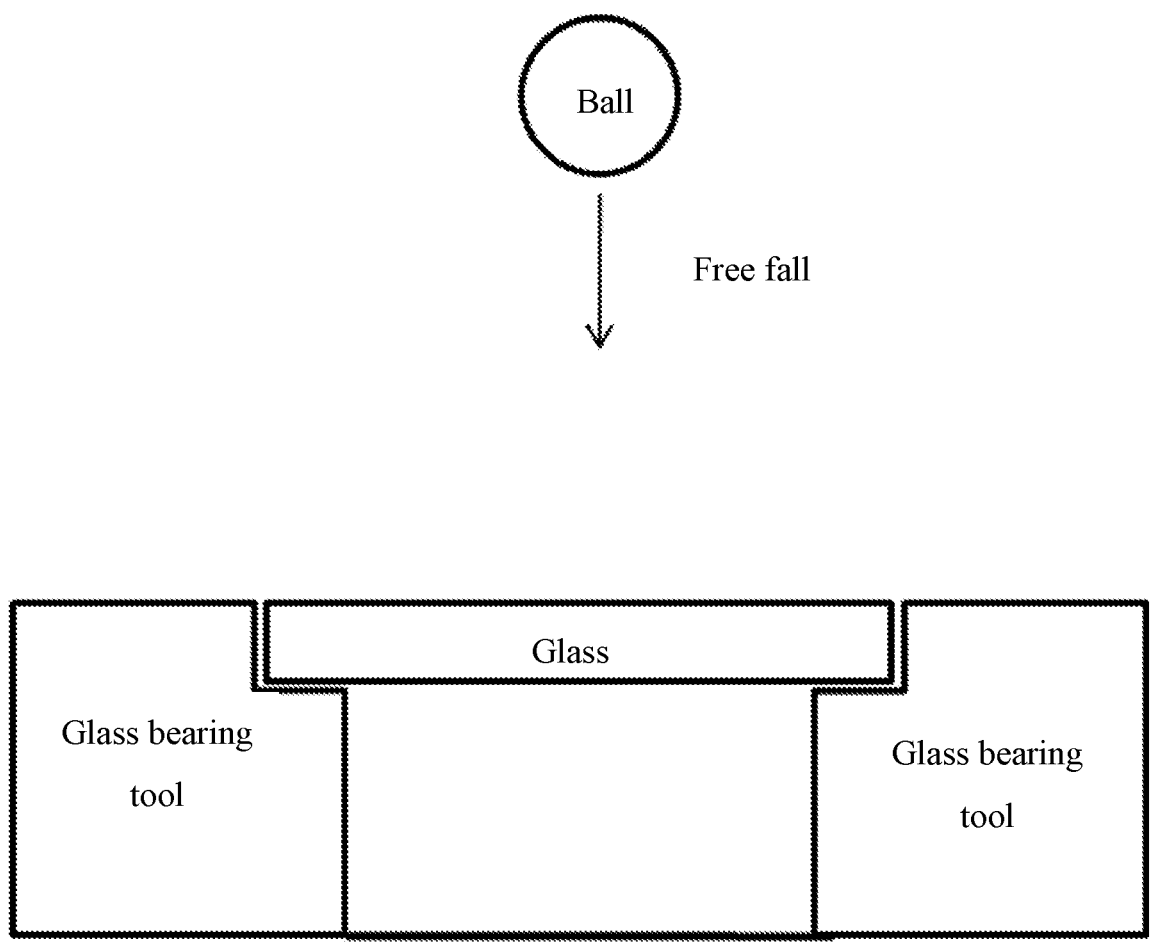
FIG. 1 is a schematic diagram showing the method for testing the fracture energy that the reinforced glass can bear when it is impacted and broken by an external force.

To make the object, the technical solution, and the advantage of the present application more clearly, the present application is further described in detail below with reference to the accompanying embodiments. Many specific details are set forth in the following description to facilitate a full understanding of the present application. However, the present application can be implemented in many other ways different from those described herein. One skilled in the art can make similar improvements without violating the connotation of the present application. Therefore, the present application is not limited by the specific implementation disclosed below.

Preparation Method One for the Reinforced Glass

The present application has provided a preparation method for a reinforced glass which comprising following steps.

The mother glass is provided to be preheated in an environment having a temperature lower than the annealing temperature of the glass. Then the preheated mother glass is subjected to a single one time of ion exchange treatment in a salt bath containing at least two kinds of Na ion, K ion, Ru ion and Cs ion. Then the mother glass is prepared to be a reinforced glass with a composite compressive stress layer on its surface.

During the above preparation process, the mother glass has a thickness range of 0.4 mm-2.0 mm, a transmittance range for a 550 nm-wavelength light of 86%-92.2%, a refractive index range of 1.48-1.54, and an alkali metal oxide molar content range of 8 mol %-22 mol %. Wherein in the mother glass, a Na oxide molar content is 2.65 mol %-18 mol %, an Al oxide molar content is 6.5 mol %~15.5 mol %.

In the mother glass of the present application, the Li oxide molar content is not higher than 18 mol %, preferably, is not higher than 12 mol %. Advantageously, the Li oxide molar content is larger than the Na oxide molar content.

In the mother glass of the present application, the sum range of the B oxide molar content, the P oxide molar content and the Si oxide molar content is 61 mol %-73 mol %; wherein the Si oxide molar content is 58.00 mol %-70.85 mol %. Preferably, the Si oxide molar content in the mother glass of the present application is 62.00 mol %-70.85 mol %.

Whether the non-silicon and non-network generator of the metal components in the mother glass can enter the network of the mother glass to become the glass network generator is related to the ratio of the molar content of the metal ion and its alkali metal oxide. When the ratio is different, the metal components will exist in the mother glass in different forms, for example, in the form of oxides outside the network, or in the form of network intermediates and so on, and the nonbridged oxygen average value and ratio in the mother glass are also different. The network structures of the mother glasses are different, the roles of the metal components are also different, so the glass performance should also be different.

In the mother glass of the present application, the ratio range between the Al oxide molar content and the sum of the Na oxide molar content and the Li oxide molar content is 0.3-1.88.

In the mother glass of the present application, the ratio range between the sum of the Al oxide molar content and the Mg oxide molar content, and the sum of the Na oxide molar content and the Li oxide molar content is 0.6-2.88.

In the mother glass of the present application, the ratio range between the sum of the Al oxide molar content, the Mg oxide molar content, the B oxide molar content and the P oxide molar content, and the sum of the Na oxide molar content and the Li oxide molar content is 0.6-3.0.

In the mother glass of the present application, the ratio range between the sum of the Al oxide molar content, the Mg oxide molar content, the B oxide molar content, the P oxide molar content and the Si oxide molar content, and the sum of the Na oxide molar content and the Li oxide molar content is 3.5-11.38.

The mother glass is amorphous and contains no nucleating agent.

The mother glass is formed by an overflow down-drawing method, a narrow seam down-drawing method, a horizontal floating method, a calendering method or a casting molding method.

During the ion exchange process, an ion exchange layer depth of the mother glass increases with an extension of an ion exchange time, wherein a compression stress layer formed by the mother glass after the ion exchange has a maximum limit depth which increases with an increase of the thickness of the mother glass and has a maximum range of 50-300 μm.

The range absolute value of a total compressive stress in different compressive stress layers formed by the mother glass after the ion exchanges under different conditions in the reinforced glass is less than or equal to 42.08 kN/m and increases with the increase of the glass thickness. The range absolute value of a total tensile stress in different tensile stress layers formed by the mother glass after the ion exchanges under different conditions in the reinforced glass is less than or equal to 42.08 kN/m and increases with the increase of the glass thickness.

The reinforced glass obtained by the above preparation method can bear a fracture energy larger than 18.67 joules per square meter (J/m$^2$) when the reinforced glass is impacted and broken by an external force, and can bear a free fall fracture energy larger than 2.94 joules per kilogram (J/kg) under a certain negative pressure.

In the obtained mother glass, the composite compressive stress layer comprises the first ion which enters into the reinforced glass through multiple times of ion exchanges and is selected from an ion group of Na ion, K ion, Ru ion and CS ion, wherein the concentration of the first ion decreases nonlinearly from the surface of the reinforced glass to the interior of the reinforced glass. The first fitting curve about the concentration of the first ion vs. the distance extending from the surface of the reinforced glass to the interior of the reinforced glass has at least one inflection point, wherein the absolute value of the curve slope on the left side of all the inflection points on the first fitting curve is greater than the absolute value of the curve slope on the right side of all the inflection points on the first fitting curve. The first ion has a concentration range of 0-18 mol %.

The compressive stress of the composite compressive stress layer decreases nonlinearly from the surface of the reinforced glass to the interior of the reinforced glass, and the composite compressive stress layer has a compressive stress curve extending from the surface of the reinforced glass to the interior of the reinforced glass, wherein a second fitting curve having at least one inflection point is obtained from the compressive stress curve by using Orihara Pmc software. The absolute value of the curve slope on the left side of all the inflection points on the second fitting curve is greater than the absolute value of the curve slope on the right side of all the inflection points on the second fitting curve.

The compressive stress of the composite compressive stress layer has the maximum between 600 MPa and 1100 MPa, and the composite compressive stress layer has a depth between 60 μm and 300 μm.

The definite integral of the second fitting curve in the range where the composite compressive stress layer locates is less than or equal to 55 kN/m.

The reinforced glass further has a tensile stress layer having the minimum tensile stress of 40 MPa and the maximum tensile stress of 116.55 MPa. The tensile stress stored in each unit volume of the reinforced glass is 20000-291375 $MN/m^3$.

The reinforced glass has a thickness between 0.4 mm and 2.0 mm.

The ratio between the absolute value of the difference between the sizes of the mother glass and the reinforced glass in the same dimension, and the size of the mother glass in the corresponding dimension is between 0.05% and 0.15%.

In the reinforced glass of the present application, the composite compressive stress layer comprises the second ion which enters into the reinforced glass through a single time of ion exchanges; wherein the second ion is selected from an ion group of Na ion, K ion, Ru ion and CS ion. The second ion is different from the second ion.

The concentration of the second ion increases nonlinearly and then decreases nonlinearly from the surface of the reinforced glass to an interior of the reinforced glass. The second ion has a concentration range of 0-18 mol %.

It should be noted that the mother glass used in the preparation method can also contain micro-nano crystal and nucleating agent selected from at least one oxide of Ti, Zr, Cr, Li, Zn, Mg, Al, P.

The specific embodiments are listed below to give a more detailed description of the preparation method provided by the present application. However, such embodiments never limit the protection scope of the present application in any way.

The condition parameters of embodiments 1-1 to 1-7 are listed as follows:

| | | Embodiment 1-1 | Embodiment 1-2 | Embodiment 1-3 | Embodiment 1-4 | Embodiment 1-5 | Embodiment 1-6 | Embodiment 1-7 |
|---|---|---|---|---|---|---|---|---|
| Mother glass | Thickness (mm) | 0.64 | 0.59 | 1.74 | 1.23 | 0.73 | 0.38 | 0.93 |
| | H (%) | 91.8 | 91.6 | 91.8 | 91.6 | 91.8 | 91.8 | 91.5 |
| | Refraction coefficient | 1.52 | 1.51 | 1.52 | 1.51 | 1.52 | 1.52 | 1.51 |
| | Forming method | Floating method | Floating method | Floating method | Floating method | Calendering method | Narrow seam down-drawing method | Narrow seam down-drawing method |
| Components and molar percentage (%) | $SiO_2$ | 70.85 | 68.00 | 63.00 | 64.50 | 66.00 | 67.00 | 63.00 |
| | $Al_2O_3$ | 7.00 | 8.50 | 6.50 | 9.30 | 14.50 | 15.00 | 13.50 |
| | $P_2O_5$ | ~ | ~ | ~ | ~ | 1.50 | 2.80 | 7.00 |
| | $B_2O_3$ | ~ | ~ | ~ | ~ | 2.70 | 3.00 | 2.00 |
| | MgO | 7.00 | 6.00 | 7.50 | 3.80 | 2.70 | 3.20 | 2.50 |
| | CaO | 0.20 | 0.10 | ~ | ~ | ~ | ~ | ~ |
| | $Li_2O$ | 7.30 | 11.00 | 18.00 | 5.40 | 8.50 | 5.35 | 8.50 |
| | ZnO | ~ | ~ | ~ | ~ | 0.80 | 1.00 | 0.20 |
| | $ZrO_2$ | 1.00 | 1.20 | 0.85 | 0.50 | ~ | ~ | ~ |
| | $TiO_2$ | 0.15 | 0.20 | 0.15 | ~ | ~ | ~ | ~ |
| | $Na_2O$ | 5.00 | 5.00 | 4.00 | 16.50 | 3.30 | 2.65 | 3.30 |
| | $K_2O$ | 1.50 | ~ | ~ | ~ | ~ | ~ | ~ |
| | O (%) | 13.80 | 16.00 | 22.00 | 21.90 | 11.80 | 8.00 | 11.80 |
| | α | 0.57 | 0.53 | 0.30 | 0.42 | 1.23 | 1.88 | 1.14 |
| | β | 1.14 | 0.91 | 0.64 | 0.60 | 1.46 | 2.28 | 1.36 |
| | γ | 1.14 | 0.91 | 0.64 | 0.60 | 1.81 | 3.00 | 2.12 |
| | χ | 6.90 | 5.16 | 3.50 | 3.54 | 7.41 | 11.38 | 7.46 |
| | T (μm) | 180 | 260 | 300 | 160 | 250 | 50 | 250 |

-continued

|  |  | Embodiment 1-1 | Embodiment 1-2 | Embodiment 1-3 | Embodiment 1-4 | Embodiment 1-5 | Embodiment 1-6 | Embodiment 1-7 |
|---|---|---|---|---|---|---|---|---|
| Salt bath composition | $NaNO_3$ (%) | 10 | 5 | 5 | 3 | 5 | 5 | 5 |
|  | $KNO_3$ (%) | 90 | 95 | 95 | 97 | 95 | 95 | 95 |
| Ion exchange treatment conditions | Time (min) | 300 | 270 | 300 | 150 | 270 | 60 | 120 |
|  | Temperature (° C.) | 400 | 400 | 430 | 400 | 430 | 400 | 400 |

Notes:
η refers to the transmittance range for the 550 nm-wavelength light.
θ refers to the molar percentage of alkali metal oxide in the mother glass.
α refers to the ratio between the Al oxide molar content and the sum of the Na oxide molar content and the Li oxide molar content.
β refers to the ratio between the sum of the Al oxide molar content and the Mg oxide molar content, and the sum of the Na oxide molar content and the Li oxide molar content.
γ refers to the ratio between the sum of the Al oxide molar content, the Mg oxide molar content, the B oxide molar content and the P oxide molar content, and the sum of the Na oxide molar content and the Li oxide molar content.
χ refers to the ratio between the sum of the Al oxide molar content, the Mg oxide molar content, the B oxide molar content, the P oxide molar content and the Si oxide molar content, and the sum of the Na oxide molar content and the Li oxide molar content.
τ refers to the maximum depth of the compressive stress layer formed by the mother glass through the ion exchange.

The characteristics of the reinforced glass obtained in the embodiments 1-1 to 1-7 are as follows:

|  |  | Embodiment 1-1 | Embodiment 1-2 | Embodiment 1-3 | Embodiment 1-4 | Embodiment 1-5 | Embodiment 1-6 | Embodiment 1-7 |
|---|---|---|---|---|---|---|---|---|
| ψ ($J/m^2$) |  | 37.33 | 29.87 | 56.00 | 44.80 | 59.73 | 18.67 | 59.73 |
| ρ (J/kg) |  | 11.76 | 9.8 | 16.66 | 13.72 | 14.7 | 2.94 | 13.72 |
| Ions contained in the composite compressive stress layer | First ion and its molar percentage (%) | K ion, 0~4.58 | K ion, 0~6.5 | K ion, 0~5.7 | K ion, 0~17 | K ion, 0~4.1 | K ion, 0~3.1 | K ion, 0~4.75 |
|  | Second ion and its molar percentage (%) | Na ion, 0~2.35 | Na ion, 0~11 | Na ion, 0~18 | Na ion, 0~5 | Na ion, 0~8.5 | Na ion, 0~5 | Na ion, 0~1.9 |
| Maximum compressive stress value (MPa) |  | 700 | 750 | 600 | 950 | 750 | 650 | 750 |
| Compressive stress layer depth (μm) |  | 130 | 180 | 300 | 70 | 180 | 60 | 110 |
| Thickness (mm) |  | 0.70 | 0.65 | 2.00 | 1.30 | 0.80 | 0.40 | 1.00 |
| Maximum tensile stress value (MPa) |  | 67 | 86.4 | 40 | 53.8 | 74.50 | 111 | 56.3 |
| δ (%) |  | 0.09 | 0.11 | 0.15 | 0.06 | 0.10 | 0.05 | 0.07 |

Notes:
ψ refers to the fracture energy larger when the reinforced glass is impacted and broken by an external force.
τ refers to the free fall fracture energy under a certain negative pressure.
δ refers to the ratio between the absolute value of the difference between sizes of the mother glass and the reinforced glass in the same dimension, and the size of the mother glass in the corresponding dimension.

It should be noted that, the length and width of the mother glass used in all the embodiments mentioned above are unified as 140*60 mm.

The method for testing the fracture energy that the reinforced glass can bear when it is impacted and broken by an external force is as follows. 32 g stainless steel ball falls freely to the center of the glass surface. The free fall impact starts from 15 cm and the height raises 5 cm each time if the glass is not broken until the glass is finally broken. The ratio between the impact energy be bore by the glass when it is broken and the area of the glass is the fracture energy that the reinforced glass can bear when it is impacted and broken by an external force (referring FIG. 1).

Figure 2:
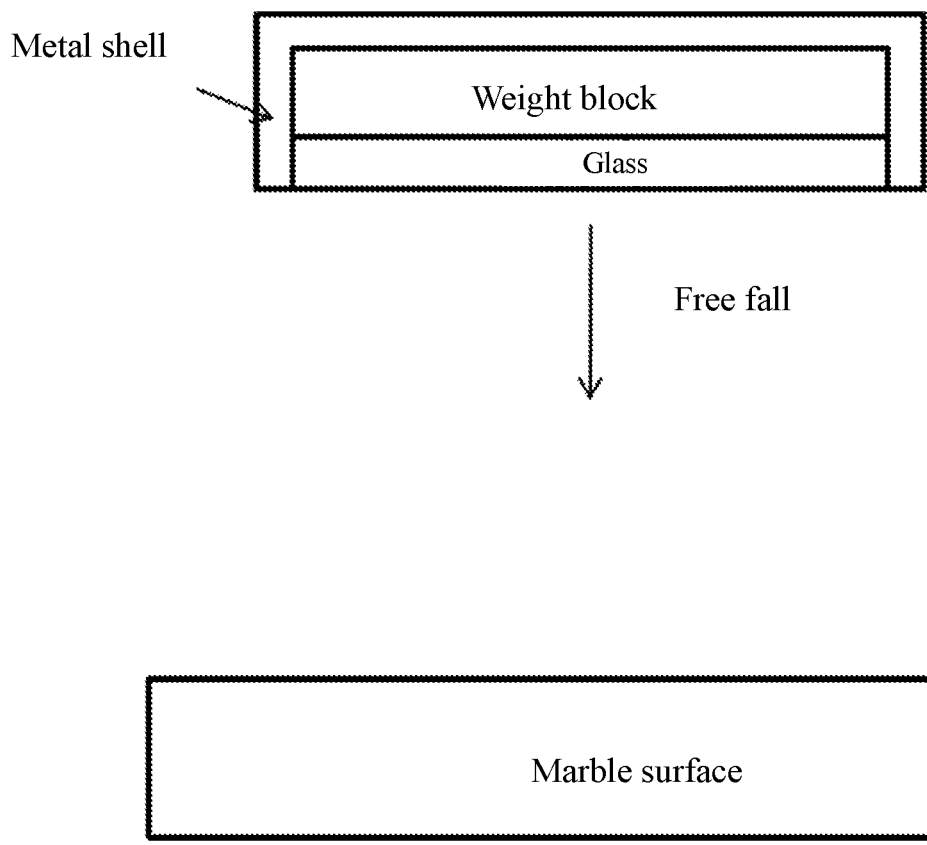
FIG. 2 is a schematic diagram showing the method for testing the free fall fracture energy that the reinforced glass can bear under a certain negative pressure.

The method for testing the free fall fracture energy that the reinforced glass can bear under a certain negative pressure is as follows. The glass and the weight block are wrapped in the metal shell and fall freely onto the smooth marble surface from a certain height. The total weight is 150 g. The free fall starts from 20 cm and the height raises 10 cm each time if the glass is not broken until the glass is finally broken. The fracture height is recorded to obtain the corresponding free fall potential energy. The ratio between the free fall potential energy and the total weight of the glass is the free fall fracture energy (referring FIG. 2).

The concentrations of the first and second ions in the reinforced glass are measured by using the scanning electron microscope (SEM) and energy dispersive spectrometer (EDS).

The compressive stress value is measured by using the Orihara Surface Stress Meter (FSM-6000LE).

The depth of compressive stress layer is measured by using Orihara Scattered Light Photoelastic Stress Meter (SLP-1000).

The tensile stress value is measured as follows. Firstly, the surface and interior compressive stress distribution data are measured by the Orihara Surface Stress Meter (FSM-6000LE) and the Orihara Scattered Light Photoelastic Stress Meter, respectively. Then the data are fitted by the Orihara Pmc software to obtain the compressive stress, the maximum tensile stress, the average tensile stress and the tensile stress distribution.

Embodiment 1-1 is taken as example for further analysis.

Figure 3:
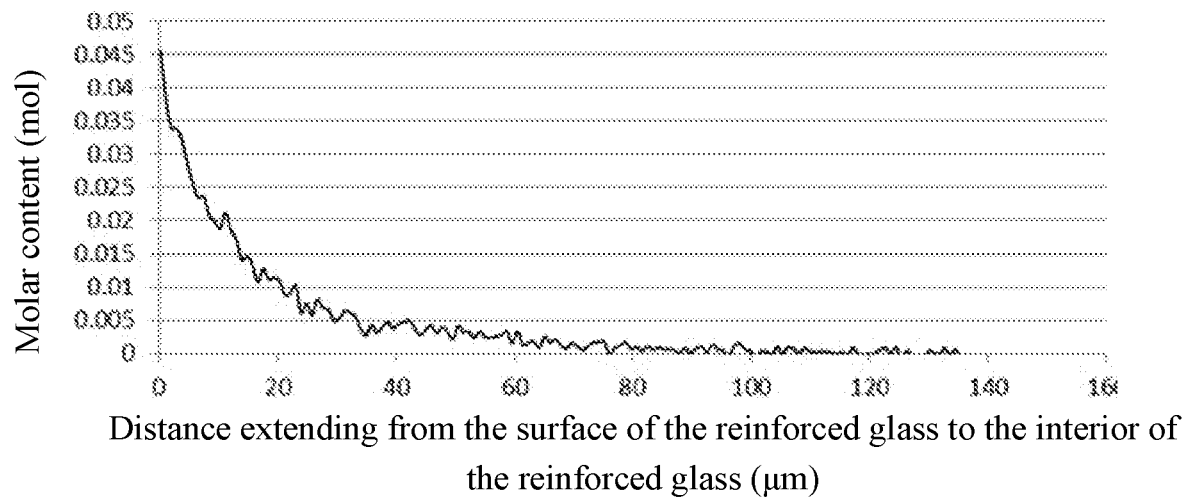
FIG. 3 shows the first fitting curve of the reinforced glass obtained in embodiment 1-1.

The molar content of the K ion in each thickness extending from the surface to the interior of the reinforced glass obtained in embodiment 1-1 are detected and the detected data are sorted by the normalization method. Then the ion concentration of K ion entering the reinforced glass through the ion exchange is obtain through subtracting the intrinsic concentration of K ion in the mother glass adopted in embodiment 1-1 from the normalized data. Then the first fitting curve about the concentration of the K ion vs. the distance extending from the surface of the reinforced glass to the interior of the reinforced glass is obtained (referring FIG. 3). It can be seen from the FIG. 3 that the concentration of K ion decreases nonlinearly from the surface of the reinforced glass to the interior of the reinforced glass. The first fitting curve has multiple inflexion points. The absolute values of the curve slopes on the left side of all the inflection points on the first fitting curve are greater than the absolute values of the curve slopes on the right side of all the inflection points on the first fitting curve. The K ion has a concentration range of 0-4.58 mol %.

Figure 4:
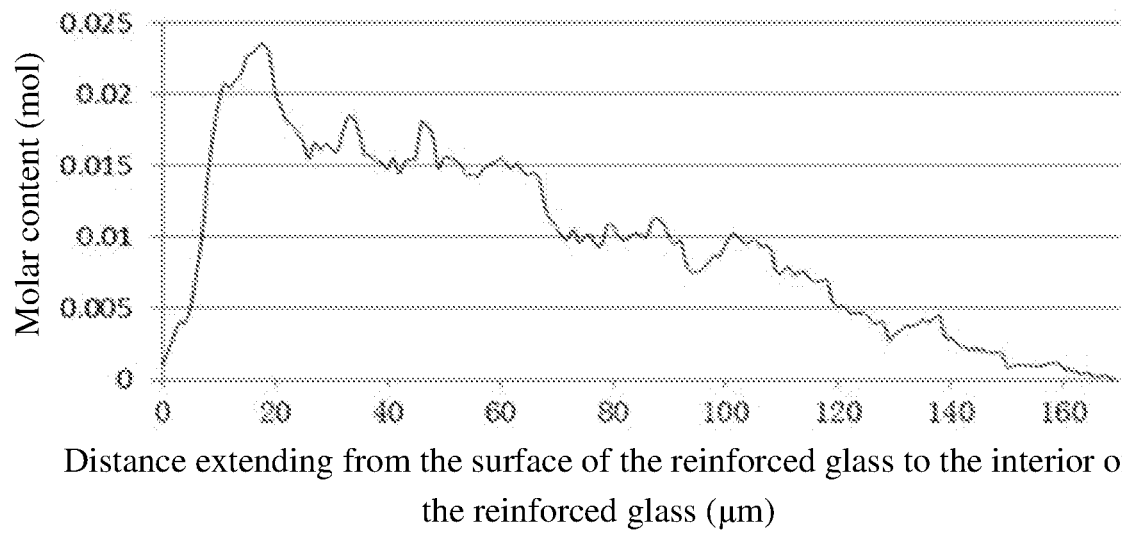
FIG. 4 shows the third fitting curve of the reinforced glass obtained in embodiment 1-1.

Similarly, the third fitting curve about the concentration of the Na ion vs. the distance extending from the surface of the reinforced glass to the interior of the reinforced glass is obtained (referring FIG. 4). It can be seen from the FIG. 4 that the concentration of Na ion increases nonlinearly and then decreases nonlinearly from the surface of the reinforced glass to the interior of the reinforced glass. The Na ion has a concentration range of 0-2.35 mol %.

In addition, the compressive stress values on each thickness extending from the surface to the interior of the reinforced glass obtained in embodiment 1-1 are detected, so that the compressive stress curve inside the reinforced glass obtained in embodiment 1-1 can be obtained. The second fitting curve can be obtained through fitting the compressive stress curve by using the Orihara Pmc software (referring FIG. 5). It can be seen from the FIG. 5 that the compressive stress in the reinforced glass obtained in embodiment 1-1 decreases nonlinearly from the surface of the reinforced glass to the interior of the reinforced glass. The composite compressive stress layer has a compressive stress curve extending from the surface of the reinforced glass to the interior of the reinforced glass. The second fitting curve obtained through fitting the compressive stress curve by using the Orihara Pmc software has one inflection point. The absolute value of the curve slope on the left side of all the inflection points on the second fitting curve is greater than the absolute value of the curve slope on the right side of all the inflection points on the second fitting curve. Referring FIG. 5, the inflection point has a coordinate value of $(x, y)=(30, 120)$.

Figure 5:
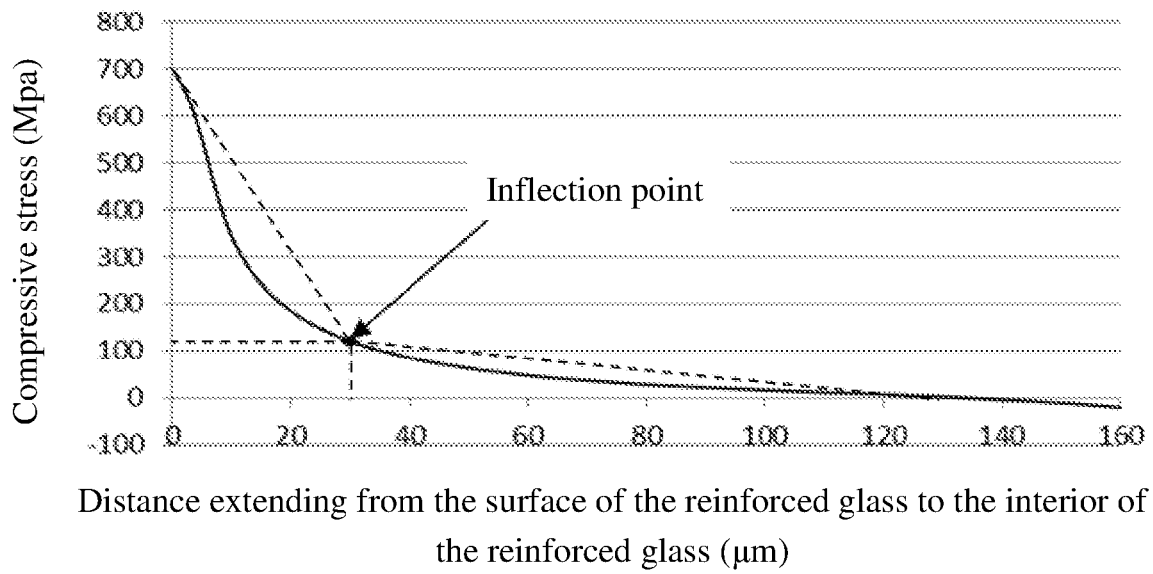
FIG. 5 shows the second fitting curve of the reinforced glass obtained in embodiment 1-1.

Moreover, according to the curve shown in FIG. 5, through the integral calculation method given below, it can be known that the definite integral of the second fitting curve shown in FIG. 5 in the range where the composite compressive stress layer locates (that is, the range [0, 130]) is less than or equal to 55 kN/m.

Integral Calculation Method

Linear fitting (as shown in the dotted line in FIG. 5) is made between the three points of the maximum compression stress, the inflection point and the maximum compression stress depth to calculate the definite integral of the second fitting curve in the interval [0, 130]. The definite integral of the second fitting curve in the interval [0, 130] is recorded as M (1-1). It is known that the point coordinate of the maximum compression stress is (0, 700), the point coordinate of the maximum compression stress depth is (130, 0) and the point coordinate of the inflection point is (x, y), then substituting x=30, y=120 into the following formula:

$$M(1-1)=x\times y+x\times(700-y)\times 0.5+y\times(130-x)\times 0.5.$$

Then, M (1-1)=18.3 kN/m is obtained.

Embodiment 1-7 is taken as example for further analysis.

The molar content of the K ion in each thickness extending from the surface to the interior of the reinforced glass obtained in embodiment 1-7 are detected and the detected data are sorted by the normalization method. Then the ion concentration of K ion entering the reinforced glass through the ion exchange is obtain through subtracting the intrinsic concentration of K ion in the mother glass adopted in embodiment 1-7 from the normalized data. Then the first fitting curve about the concentration of the K ion vs. the distance extending from the surface of the reinforced glass to the interior of the reinforced glass is obtained (referring FIG. 6). It can be seen from the FIG. 6 that the concentration of K ion decreases nonlinearly from the surface of the reinforced glass to the interior of the reinforced glass. The first fitting curve has multiple inflexion points. The absolute values of the curve slopes on the left side of all the inflection points on the first fitting curve are greater than the absolute values of the curve slopes on the right side of all the inflection points on the first fitting curve. The K ion has a concentration range of 0-4.75 mol %.

Similarly, the third fitting curve about the concentration of the Na ion vs. the distance extending from the surface of the reinforced glass to the interior of the reinforced glass is obtained (referring FIG. 7). It can be seen from the FIG. 7 that the concentration of Na ion increases nonlinearly and then decreases nonlinearly from the surface of the reinforced glass to the interior of the reinforced glass. The Na ion has a concentration range of 0-1.9 mol %.

In addition, the compressive stress values on each thickness extending from the surface to the interior of the reinforced glass obtained in embodiment 1-7 are detected, so that the compressive stress curve inside the reinforced glass obtained in embodiment 1-7 can be obtained. The second fitting curve can be obtained through fitting the compressive stress curve by using the Orihara Pmc software (referring FIG. 8). It can be seen from the FIG. 8 that the compressive stress in the reinforced glass obtained in embodiment 1-7 decreases nonlinearly from the surface of the reinforced glass to the interior of the reinforced glass. The composite compressive stress layer has a compressive stress curve extending from the surface of the reinforced glass to the interior of the reinforced glass. The second fitting curve obtained through fitting the compressive stress curve by using the Orihara Pmc software has one inflection point. The absolute value of the curve slope on the left side of all the inflection points on the second fitting curve is greater than the absolute value of the curve slope on the right side of all the inflection points on the second fitting curve. Referring FIG. 8, the inflection point has a coordinate value of $(x, y)=(30, 120)$.

Figure 8:
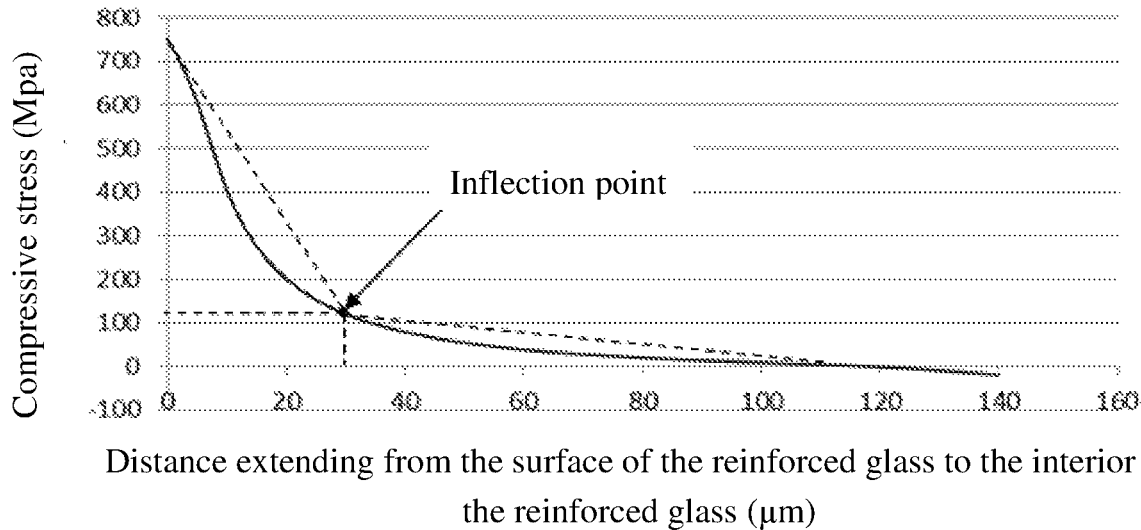
FIG. 8 shows the second fitting curve of the reinforced glass obtained in embodiment 1-7.

Moreover, according to the curve shown in FIG. 8, through the integral calculation method given below, it can be known that the definite integral of the second fitting curve shown in FIG. 8 in the range where the composite compressive stress layer locates (that is, the range [0, 110]) is less than or equal to 55 kN/m.

Integral Calculation Method

Linear fitting (as shown in the dotted line in FIG. 8) is made between the three points of the maximum compression stress, the inflection point and the maximum compression stress depth to calculate the definite integral of the second fitting curve in the interval [0, 110]. The definite integral of the second fitting curve in the interval [0, 110] is recorded as M (1-7). It is known that the point coordinate of the maximum compression stress is (0, 750), the point coordinate of the maximum compression stress depth is (110, 0) and the point coordinate of the inflection point is (x, y), then substituting x=30, y=120 into the following formula:

$$M(1-7)=x \times y + x \times (750-y) \times 0.5 + y \times (110-x) \times 0.5.$$

Then, M (1-7)=17.85 kN/m is obtained.

Preparation Method Two for the Reinforced Glass

The present application has provided a further preparation method for a reinforced glass which comprising following steps.

Step A, the mother glass is provided to be preheated in an environment having a temperature lower than the annealing temperature of the glass. Then the preheated mother glass is subjected to the first ion exchange treatment in a salt bath. The first ion exchange treatment lasts for a first time $t_1$ and forms the reinforced layer $L_1$ on the surface of the mother glass.

Step B, the mother glass with the reinforced layer $L_1$ is preheated in an environment having a temperature $T_h$ which has a range not lower than 10° C. from the ion exchange temperature in step A or step C to the annealing temperature of the glass (that is [the ion exchange temperature in step A or step C-10° C.—annealing temperature of the glass-10° C.]). The preheating time is $t_h$ which is arranged to enable the reinforced layer $L_1$ to extend and move for at least 3 μm towards the interior of the glass, such that the distribution of the ion concentration in the reinforced layer $L_1$ is diluted, and the reinforced layer $L_2$ is formed by integrating the ions newly exchanged in this step.

In step C, the mother glass with the reinforced layer $L_2$ is cooled to the temperature of the salt bath, and directly subjected to the second ion exchange process in the same or different salt bath as that in Step A. Or the mother glass is cleaned and then placed into a salt bath different from that in Step A for subjecting to the second ion exchange process. The second ion exchange treatment lasts for the second time $t_2$ and the second ion exchange temperature is $T_2$. A reinforced layer $L_3$ is formed on the surface of the mother glass having the reinforced layer $L_2$ by the ion exchange. Meanwhile, the reinforced layer $L_2$ inside the mother glass undergoes the ion exchange with the ions inside and peripheral to the mother glass and extends continuously toward the interior and periphery of the glass along the direction of the concentration difference. The reinforced layer $L_3$ extends at a rate higher than that of the reinforced layer $L_2$. After the full ion exchange reaction, the reinforced layer $L_3$ is overlapped with the reinforced layer $L_2$ to form the composite reinforced layer.

Preferably, steps B-C are repeated until the composite reinforced layer having the satisfactory compressive stress and depth is formed on the glass.

Alternatively, the glass may be cleaned prior to step B, while the glass may be preheated prior to step C.

The mother glass used in the preparation method two has the same properties as the mother glass used in the preparation method one, which will not be described here. The reinforced glass obtained by the preparation method two has the same properties as the reinforced glass obtained by the preparation method one, which will not be described here.

The specific embodiments are listed below to give a more detailed description of the preparation method two provided by the present application. However, such embodiments never limit the protection scope of the present application in any way.

The condition parameters of embodiments are listed as follows:

|  |  | Embodiment 2-1 | Embodiment 2-2 | Embodiment 2-3 | Embodiment 2-4 | Embodiment 2-5 | Embodiment 2-6 |
| --- | --- | --- | --- | --- | --- | --- | --- |
| Mother glass | Thickness (mm) | 1.18 | 0.75 | 0.67 | 1.02 | 0.65 | 0.50 |
|  | η (%) | 91.6 | 91.8 | 91.5 | 86.0 | 86.0 | 91.5 |
|  | Refraction coefficient | 1.50 | 1.48 | 1.52 | 1.54 | 1.53 | 1.52 |
|  | Forming method | Overflow down-drawing method | Overflow down-drawing method | Floating method | Calendering method | Casting molding method | Casting molding method |
| Components and molar percentage (%) | $SiO_2$ | 62.50 | 58.00 | 65.00 | 60.50 | 62.50 | 63.00 |
|  | $Al_2O_3$ | 12.00 | 15.00 | 9.00 | 11.00 | 11.50 | 9.50 |
|  | $P_2O_5$ | 2.00 | 6.00 | ~ | ~ | ~ | ~ |
|  | $B_2O_3$ | 0.50 | ~ | ~ | ~ | ~ | ~ |
|  | MgO | 3.00 | 3.00 | 3.50 | 10.50 | 10.00 | 8.50 |
|  | CaO | ~ | ~ | ~ | 0.80 | ~ | ~ |
|  | $Li_2O$ | 12.00 |  |  |  |  | 4.5 |
|  | ZnO | 1.00 | ~ | ~ | ~ | ~ | ~ |
|  | $ZrO_2$ | ~ | ~ | 0.50 |  | 4 | 1 |
|  | $TiO_2$ | ~ | ~ | ~ | 4.20 | ~ | ~ |
|  | $Na_2O$ | 7.00 | 18.00 | 17.00 | 11.00 | 12.00 | 13.50 |
|  | $K_2O$ | ~ | ~ | 5.00 | 2.00 | ~ | ~ |
|  | 0 (%) | 19.00 | 18.00 | 22.00 | 13.00 | 12.00 | 18.00 |
|  | α | 0.63 | 0.83 | 0.53 | 1.00 | 0.96 | 0.53 |
|  | β | 0.79 | 1.00 | 0.74 | 1.95 | 1.79 | 1.00 |
|  | γ | 0.92 | 1.33 | 0.74 | 1.95 | 1.79 | 1.00 |
|  | χ | 4.21 | 4.56 | 4.56 | 7.45 | 7.00 | 4.50 |
|  | τ (μm) | 300 | 150 | 150 | 180 | 180 | 250 |
| Salt bath composition of first ion exchange | $NaNO_3$ (%) | 100 | 40 | 0 | 40 | 0 | 50 |
|  | $KNO_3$ (%) | 0 | 60 | 100 | 60 | 100 | 50 |
| Treatment conditions for first ion exchange | Time (min) | 60 | 360 | 180 | 400 | 300 | 60 |
|  | Temperature (° C.) | 400 | 430 | 430 | 500 | 500 | 400 |
| Heat treatment conditions | Time (min) | 30 | 60 | 60 | 60 | 120 | 30 |
|  | Temperature (° C.) | 390 | 450 | 450 | 420 | 500 | 390 |

-continued

|  |  | Embodiment 2-1 | Embodiment 2-2 | Embodiment 2-3 | Embodiment 2-4 | Embodiment 2-5 | Embodiment 2-6 |
|---|---|---|---|---|---|---|---|
| Salt bath composition of Second ion exchange | $NaNO_3$ (%) | 0 | 0 | 0 | 0 | 0 | 0 |
|  | $KNO_3$ (%) | 100 | 100 | 100 | 100 | 100 | 100 |
| Treatment conditions for second ion exchange | Time (min) | 30 | 150 | 60 | 20 | 150 | 30 |
|  | Temperature (° C.) | 390 | 410 | 410 | 450 | 410 | 390 |

Notes:
η refers to the transmittance range for the 550 nm-wavelength light.
θ refers to the molar percentage of alkali metal oxide in the mother glass.
α refers to the ratio between the Al oxide molar content and the sum of the Na oxide molar content and the Li oxide molar content.
β refers to the ratio between the sum of the Al oxide molar content and the Mg oxide molar content, and the sum of the Na oxide molar content and the Li oxide molar content.
γ refers to the ratio between the sum of the Al oxide molar content, the Mg oxide molar content, the B oxide molar content and the P oxide molar content, and the sum of the Na oxide molar content and the Li oxide molar content.
χ refers to the ratio between the sum of the Al oxide molar content, the Mg oxide molar content, the B oxide molar content, the P oxide molar content and the Si oxide molar content, and the sum of the Na oxide molar content and the Li oxide molar content.
τ refers to the maximum depth of the compressive stress layer formed by the mother glass through the ion exchange.

The characteristics of the reinforced glass obtained in the embodiments

|  |  | Embodiment 2-1 | Embodiment 2-2 | Embodiment 2-3 | Embodiment 2-4 | Embodiment 2-5 | Embodiment 2-6 |
|---|---|---|---|---|---|---|---|
| ψ ($J/m^2$) |  | 59.73 | 44.80 | 44.80 | 74.67 | 74.67 | 44.80 |
| (%) ρ (J/kg) |  | 15.68 | 6.86 | 5.88 | 15.68 | 14.7 | 6.86 |
| Ions contained in the composite compressive stress layer | First ion and its molar percentage (%) | Na ion, 0~12 | K ion, 0~5.03 | K ion, 0~5 | K ion, 0~4.5 | Na ion, 0~4 | Na ion, 0~4.5 |
|  | Second ion and its molar percentage (%) | K ion, 0~8.3 | K ion, 0~18 | K ion, 0~16 | K ion, 0~10.2 | K ion, 0~12 | K ion, 0~14.3 |
| Compressive stress value (MPa) |  | 950 | 780 | 750 | 1100 | 950 | 950 |
| Compressive stress layer depth (μm) |  | 110 | 90 | 70 | 130 | 100 | 90 |
| Thickness (mm) |  | 1.30 | 0.80 | 0.70 | 1.10 | 0.70 | 0.55 |
| Maximum tensile stress value (MPa) |  | 57 | 55 | 52 | 67 | 84 | 92 |
| δ (%) |  | 0.10 | 0.06 | 0.05 | 0.08 | 0.07 | 0.09 |

Notes:
ψ refers to the fracture energy larger when the reinforced glass is impacted and broken by an external force.
τ refers to the free fall fracture energy under a certain negative pressure.
δ refers to the ratio between the absolute value of the difference between sizes of the mother glass and the reinforced glass in the same dimension, and the size of the mother glass in the corresponding dimension.

Embodiment 2-2 is taken as example for further analysis.

Figure 9:
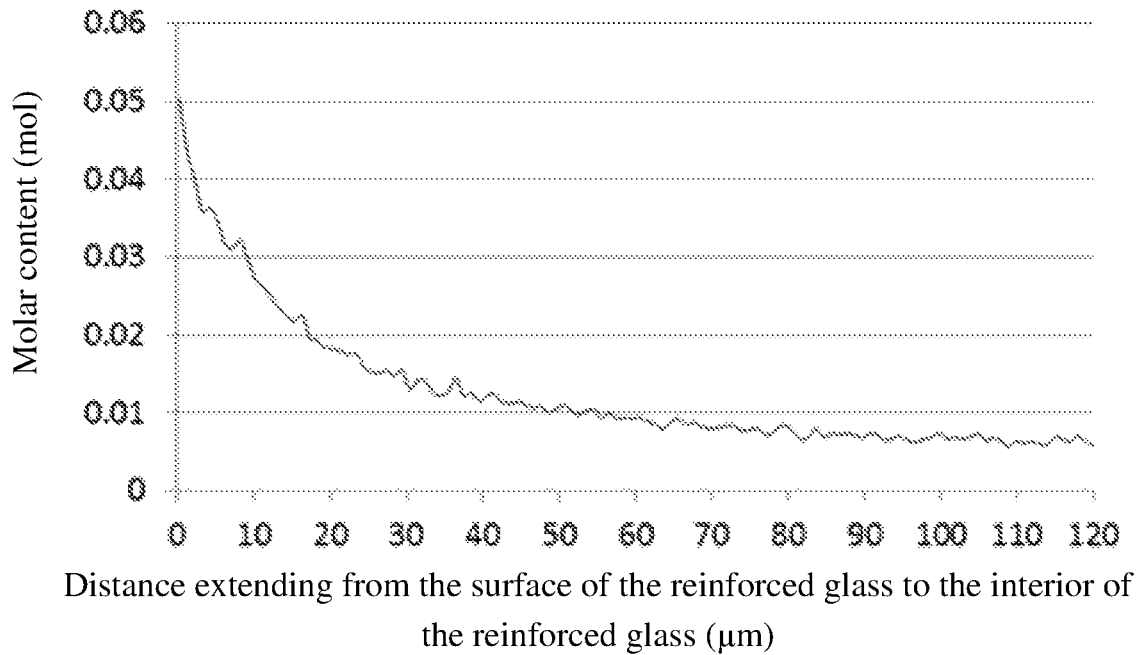
FIG. 9 shows the first fitting curve of the reinforced glass obtained in embodiment 2-2.

The molar content of the K ion in each thickness extending from the surface to the interior of the reinforced glass obtained in embodiment 2-2 are detected and the detected data are sorted by the normalization method. Then the ion concentration of K ion entering the reinforced glass through the ion exchange is obtain through subtracting the intrinsic concentration of K ion in the mother glass adopted in embodiment 2-2 from the normalized data. Then the first fitting curve about the concentration of the K ion vs. the distance extending from the surface of the reinforced glass to the interior of the reinforced glass is obtained (referring FIG. 9). It can be seen from the FIG. 9 that the concentration of K ion decreases nonlinearly from the surface of the reinforced glass to the interior of the reinforced glass. The first fitting curve has multiple inflexion points. The absolute values of the curve slopes on the left side of all the inflection points on the first fitting curve are greater than the absolute values of the curve slopes on the right side of all the inflection points on the first fitting curve. The K ion has a concentration range of 0-5.03 mol %.

In addition, the compressive stress values on each thickness extending from the surface to the interior of the reinforced glass obtained in embodiment 2-2 are detected, so that the compressive stress curve inside the reinforced glass obtained in embodiment 2-2 can be obtained. The second fitting curve can be obtained through fitting the compressive stress curve by using the Orihara Pmc software (referring FIG. 10). It can be seen from the FIG. 10 that the compressive stress in the reinforced glass obtained in embodiment 2-2 decreases nonlinearly from the surface of the reinforced glass to the interior of the reinforced glass. The composite compressive stress layer has a compressive stress curve extending from the surface of the reinforced glass to the interior of the reinforced glass. The second fitting curve obtained through fitting the compressive stress curve by using the Orihara Pmc software has one inflection point. The absolute value of the curve slope on the left side of all the inflection points on the second fitting curve is greater than the absolute value of the curve slope on the right side of all the inflection points on the second fitting curve. Referring FIG. 10, the inflection point has a coordinate value of (x, y)=(30, 100).

Figure 10:
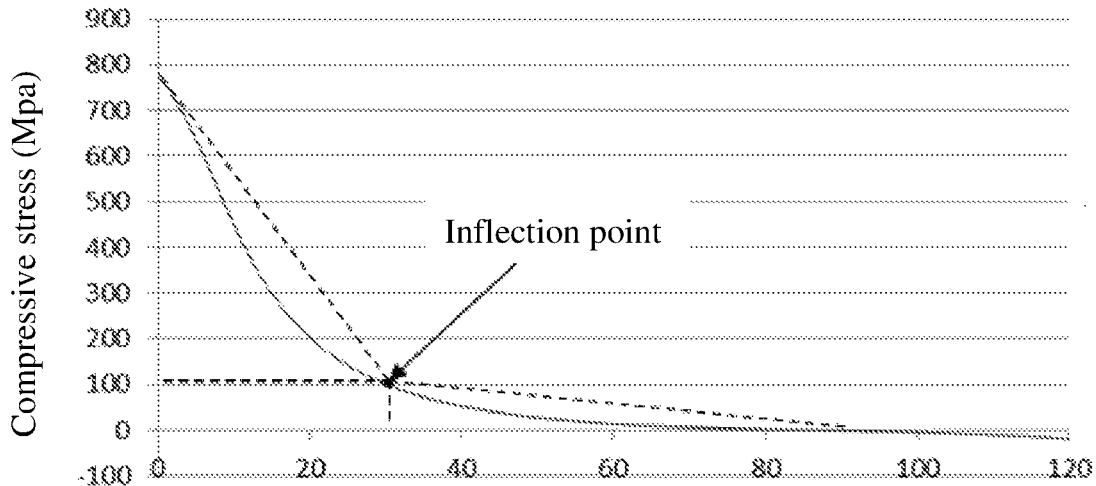
FIG. 10 shows the second fitting curve of the reinforced glass obtained in embodiment 2-2.

Moreover, according to the curve shown in FIG. 10, through the integral calculation method given below, it can be known that the definite integral of the second fitting curve shown in FIG. 10 in the range where the composite compressive stress layer locates (that is, the range [0, 90]) is less than or equal to 55 kN/m.

Integral Calculation Method

Linear fitting (as shown in the dotted line in FIG. 10) is made between the three points of the maximum compression stress, the inflection point and the maximum compression stress depth to calculate the definite integral of the second fitting curve in the interval [0, 90]. The definite integral of the second fitting curve in the interval [0, 90] is recorded as M (2-2). It is known that the point coordinate of the maximum compression stress is (0, 780), the point coordinate of the maximum compression stress depth is (90, 0) and the point coordinate of the inflection point is (x, y), then substituting x=30, y=100 into the following formula:

$$M(2\text{-}2) = x \times y + x \times (780 - y) \times 0.5 + y \times (90 - x) \times 0.5.$$

Then, M (2-2)=16.2 kN/m is obtained.

Preparation Method Three for the Reinforced Glass

The present application has provided a preparation method for a reinforced glass which comprising following steps:

providing a mother glass;

preheating the mother glass in an environment having a temperature lower than the annealing temperature of the glass;

subjecting the preheated mother glass to a first ion exchange treatment in a salt bath containing at least two kinds of Na ion, K ion, Ru ion and Cs ion;

subjecting the mother glass after the first ion exchange treatment to a second ion exchange treatment in a salt bath containing at least one kind of Na ion, K ion, Ru ion and Cs ion;

preparing the mother glass into the reinforced glass with a composite compressive stress layer on its surface finally.

The mother glass used in the preparation method three has the same properties as the mother glass used in the preparation method one, which will not be described here. The reinforced glass obtained by the preparation method three has the same properties as the reinforced glass obtained by the preparation method one, which will not be described here.

The specific embodiments are listed below to give a more detailed description of the preparation method three provided by the present application. However, such embodiments never limit the protection scope of the present application in any way.

The condition parameters of embodiments are listed as follows:

|  |  |  | Embodiment 3-1 | Embodiment 3-2 | Embodiment 3-3 | Embodiment 3-4 | Embodiment 3-5 | Embodiment 3-6 |
|---|---|---|---|---|---|---|---|---|
| Mother glass | Thickness (mm) |  | 0.62 | 0.88 | 1.15 | 1.33 | 1.83 | 0.37 |
|  | η (%) |  | 91.5 | 91.5 | 91.6 | 91.8 | 92.2 | 91.5 |
|  | Refraction coefficient |  | 1.52 | 1.51 | 1.52 | 1.51 | 1.52 | 1.51 |
|  | Forming method |  | Floating method | Calendering method | Narrow seam down-drawing method | Overflow down-drawing method | Overflow down-drawing method | Overflow down-drawing method |
|  | Components and molar percentage (%) | $SiO_2$ | 64.00 | 62.00 | 67.00 | 68.50 | 62.00 | 64.00 |
|  |  | $Al_2O_3$ | 8.00 | 13.50 | 7.70 | 9.50 | 15.50 | 15.00 |
|  |  | $P_2O_5$ | ~ | 2.50 | 1.00 | 2.20 | 2.50 | 2.50 |
|  |  | $B_2O_3$ | ~ | 2.20 | ~ | ~ | ~ | 2.50 |
|  |  | MgO | 5.50 | 2.80 | 9.50 | 7.50 | ~ | ~ |
|  |  | $Li_2O$ | 16.50 | 11.00 | 9.40 | 7.70 | 7.70 | 6.00 |
|  |  | ZnO | ~ | 1.00 | ~ | ~ | 1.00 | 1.00 |
|  |  | $ZrO_2$ | 0.50 | ~ | 0.50 | 0.10 | ~ | ~ |
|  |  | $TiO_2$ | ~ | ~ | 0.10 | 0.10 | ~ | ~ |
|  |  | $Na_2O$ | 5.50 | 5.00 | 3.80 | 4.40 | 11.30 | 9.00 |
|  |  | $K_2O$ | ~ | ~ | 1.00 | ~ | ~ | ~ |
|  | θ (%) |  | 22.00 | 16.00 | 14.20 | 12.10 | 19.00 | 15.00 |
|  | α |  | 0.36 | 0.84 | 0.58 | 0.79 | 0.82 | 1.00 |
|  | β |  | 0.61 | 1.02 | 1.30 | 1.40 | 0.82 | 1.00 |
|  | γ |  | 0.61 | 1.31 | 1.38 | 1.59 | 0.95 | 1.33 |
|  | χ |  | 3.52 | 5.19 | 6.45 | 7.25 | 4.21 | 5.60 |
|  | τ (μm) |  | 300 | 250 | 240 | 240 | 300 | 280 |
| Salt bath composition of first ion exchange | $NaNO_3$ (%) |  | 80 | 80 | 80 | 80 | 75 | 36 |
|  | $KNO_3$ (%) |  | 20 | 20 | 20 | 20 | 25 | 64 |
| Treatment conditions for first ion exchange | Time (min) |  | 120 | 120 | 150 | 150 | 180 | 60 |
|  | Temperature (° C.) |  | 420 | 420 | 420 | 420 | 420 | 390 |
| Salt bath composition of Second ion exchange | $NaNO_3$ (%) |  | 8 | 3 | 3 | 3 | 0 | 5 |
|  | $KNO_3$ (%) |  | 92 | 97 | 97 | 97 | 100 | 95 |
| Treatment conditions for second ion exchange | Time (min) |  | 30 | 30 | 30 | 30 | 40 | 20 |
|  | Temperature (° C.) |  | 390 | 390 | 390 | 390 | 390 | 390 |

Notes:
η refers to the transmittance range for the 550 nm-wavelength light.
θ refers to the molar percentage of alkali metal oxide in the mother glass.
α refers to the ratio between the Al oxide molar content and the sum of the Na oxide molar content and the Li oxide molar content.
β refers to the ratio between the sum of the Al oxide molar content and the Mg oxide molar content, and the sum of the Na oxide molar content and the Li oxide molar content.
γ refers to the ratio between the sum of the Al oxide molar content, the Mg oxide molar content, the B oxide molar content and the P oxide molar content, and the sum of the Na oxide molar content and the Li oxide molar content.
χ refers to the ratio between the sum of the Al oxide molar content, the Mg oxide molar content, the B oxide molar content, the P oxide molar content and the Si oxide molar content, and the sum of the Na oxide molar content and the Li oxide molar content.
τ refers to the maximum depth of the compressive stress layer formed by the mother glass through the ion exchange.

The characteristics of the reinforced glass obtained in the embodiments

|  |  | Embodiment 3-1 | Embodiment 3-2 | Embodiment 3-3 | Embodiment 3-4 | Embodiment 3-5 | Embodiment 3-6 |
|---|---|---|---|---|---|---|---|
| $\psi$ (J/m$^2$) | | 44.80 | 56.00 | 59.73 | 59.73 | 74.67 | 26.13 |
| $\rho$ (J/kg) | | 12.74 | 9.8 | 15.68 | 16.66 | 17.64 | 3.92 |
| Ions contained in the composite compressive stress layer | First ion and its molar percentage (%) | Na ion, 0~16.5 | K ion, 0~11 | K ion, 0~9.4 | K ion, 0~7.7 | K ion, 0~3.87 | Na ion, 0~6 |
| | Second ion and its molar percentage (%) | K ion, 0~7.7 | K ion, 0~6.2 | K ion, 0~4.8 | K ion, 0~5.3% | Na ion, 0~3.37% | K ion, 0~9.9% |
| Compressive stress value (MPa) | | 780.00 | 950.00 | 950.00 | 950.00 | 1100.00 | 980.00 |
| Compressive stress layer depth (μm) | | 140 | 130 | 150 | 170 | 300.00 | 80.00 |
| Thickness (mm) | | 1.30 | 0.80 | 0.70 | 1.10 | 0.70 | 0.55 |
| Maximum tensile stress value (MPa) | | 69.00 | 58.00 | 63.00 | 50.00 | 42.00 | 116.55 |
| δ (%) | | 0.13 | 0.13 | 0.13 | 0.13 | 0.09 | 0.08 |

Notes:
ψ refers to the fracture energy larger when the reinforced glass is impacted and broken by an external force.
τ refers to the free fall fracture energy under a certain negative pressure.
δ refers to the ratio between the absolute value of the difference between sizes of the mother glass and the reinforced glass in the same dimension, and the size of the mother glass in the corresponding dimension.

Embodiment 3-5 is taken as example for further analysis.

Figure 11:
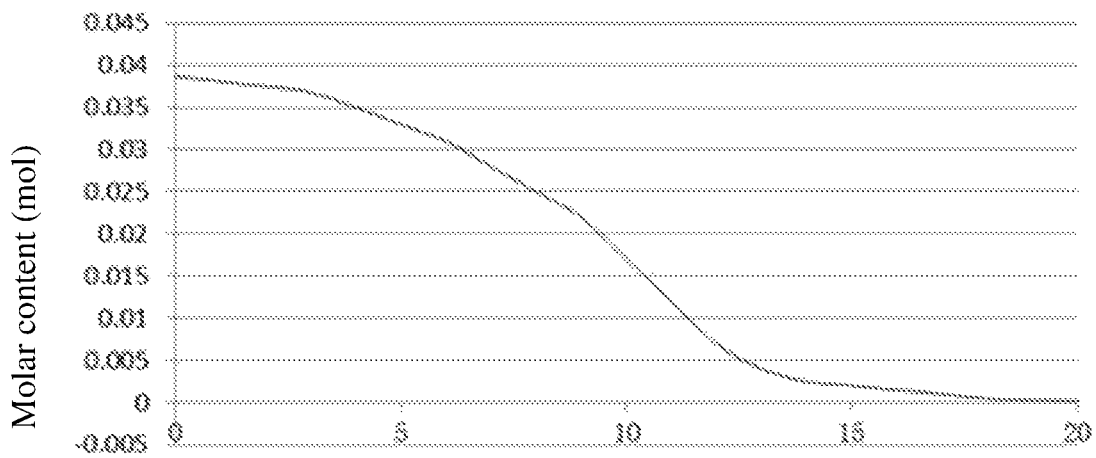
FIG. 11 shows the first fitting curve of the reinforced glass obtained in embodiment 3-5.

The molar content of the K ion in each thickness extending from the surface to the interior of the reinforced glass obtained in embodiment 3-5 are detected and the detected data are sorted by the normalization method. Then the ion concentration of K ion entering the reinforced glass through the ion exchange is obtain through subtracting the intrinsic concentration of K ion in the mother glass adopted in embodiment 3-5 from the normalized data. Then the first fitting curve about the concentration of the K ion vs. the distance extending from the surface of the reinforced glass to the interior of the reinforced glass is obtained (referring FIG. 11). It can be seen from the FIG. 11 that the concentration of K ion decreases nonlinearly from the surface of the reinforced glass to the interior of the reinforced glass. The first fitting curve has multiple inflexion points. The absolute values of the curve slopes on the left side of all the inflection points on the first fitting curve is greater than the absolute values of the curve slopes on the right side of all the inflection points on the first fitting curve. The K ion has a concentration range of 0-3.87 mol %.

Figure 12:
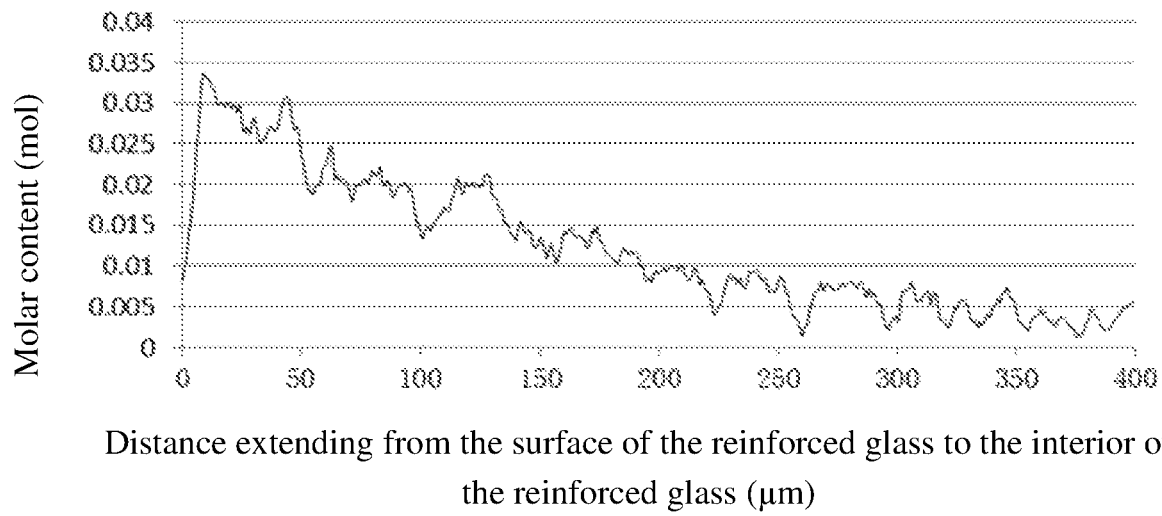
FIG. 12 shows the third fitting curve of the reinforced glass obtained in embodiment 3-5.

Similarly, the third fitting curve about the concentration of the Na ion vs. the distance extending from the surface of the reinforced glass to the interior of the reinforced glass is obtained (referring FIG. 12). It can be seen from the FIG. 12 that the concentration of Na ion increases nonlinearly and then decreases nonlinearly from the surface of the reinforced glass to the interior of the reinforced glass. The Na ion has a concentration range of 0-3.37 mol %.

In addition, the compressive stress values on each thickness extending from the surface to the interior of the reinforced glass obtained in embodiment 3-5 are detected, so that the compressive stress curve inside the reinforced glass obtained in embodiment 3-5 can be obtained. The second fitting curve can be obtained through fitting the compressive stress curve by using the Orihara Pmc software (referring FIG. 13). It can be seen from the FIG. 13 that the compressive stress in the reinforced glass obtained in embodiment 3-5 decreases nonlinearly from the surface of the reinforced glass to the interior of the reinforced glass. The composite compressive stress layer has a compressive stress curve extending from the surface of the reinforced glass to the interior of the reinforced glass. The compressive stress curve obtains the second fitting curve having one inflection point after fitting by using Orihara Pmc software. The absolute value of the curve slope on the left side of all the inflection points on the second fitting curve is greater than the absolute value of the curve slope on the right side of all the inflection points on the second fitting curve. Referring FIG. 13, the inflection point has a coordinate value of (x, y)=(12, 150).

Figure 13:
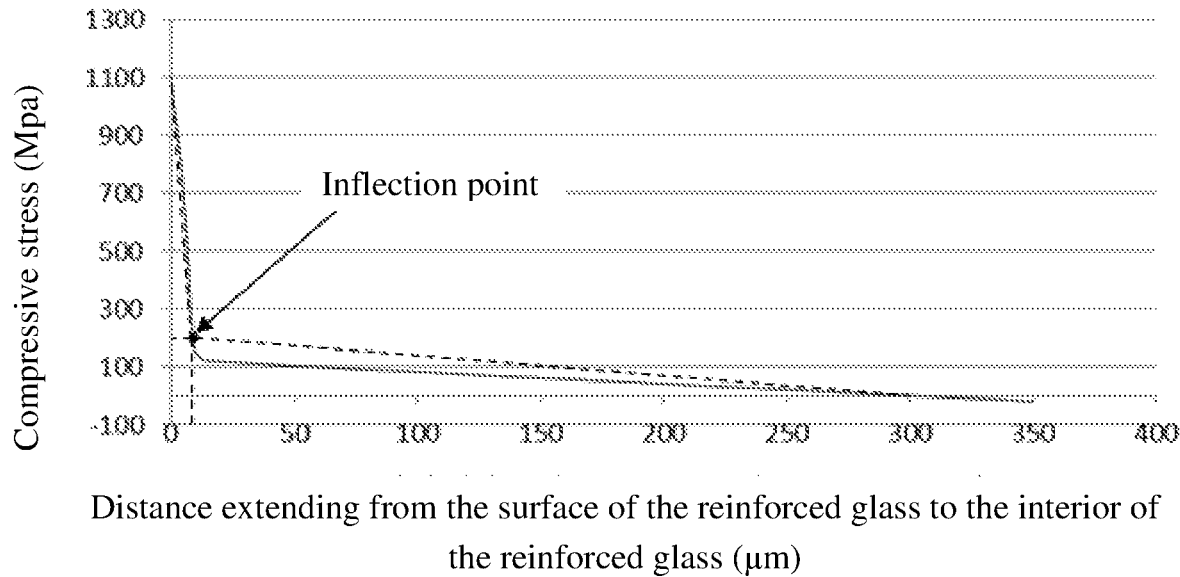
FIG. 13 shows the second fitting curve of the reinforced glass obtained in embodiment 3-5.

Moreover, according to the curve shown in FIG. 13, through the integral calculation method given below, it can be known that the definite integral of the second fitting curve shown in FIG. 13 in the range where the composite compressive stress layer locates (that is, the range [0, 300]) is less than or equal to 55 kN/m.

Integral Calculation Method

Linear fitting (as shown in the dotted line in FIG. 13) is made between the three points of the maximum compression stress, the inflection point and the maximum compression stress depth to calculate the definite integral of the second fitting curve in the interval [0, 300]. The definite integral of the second fitting curve in the interval [0, 300] is recorded as M (3-5). It is known that the point coordinate of the maximum compression stress is (0, 1100), the point coordinate of the maximum compression stress depth is (300, 0) and the point coordinate of the inflection point is (x, y), then substituting x=12, y=150 into the following formula:

$$M(3\text{-}5) = x \times y + x \times (1100-y) \times 0.5 + y \times (300-x) \times 0.5.$$

Then, M (3-5)=29.1 kN/m is obtained.

Embodiment 3-7

The applicant also carried out additional experiments on the mother glass used in embodiment 3-5, which is different from embodiment 3-5 in that the salt bath for the first ion exchange is changed to 100% NaNO$_3$, and the treatment conditions for the second ion exchange is changed to 420° C., 270 minutes; while the salt bath for the second ion exchange is changed to 100% KNO$_3$, and the treatment conditions for the second ion exchange are changed to 390° C., 120 minutes.

The reinforced glass obtained in embodiment 3-7 has a compressive stress depth of 300 μm, a maximum compressive stress of 800 MPa. In addition, the compressive stress values on each thickness extending from the surface to the interior of the reinforced glass obtained in embodiment 3-7 are detected, so that the compressive stress curve inside the reinforced glass obtained in embodiment 3-7 can be obtained. The second fitting curve can be obtained through fitting the compressive stress curve by using the Orihara Pmc software (referring FIG. 14). It can be seen from the FIG. 14 that the compressive stress in the reinforced glass obtained in embodiment 3-7 decreases nonlinearly from the surface of the reinforced glass to the interior of the reinforced glass. The composite compressive stress layer has a compressive stress curve extending from the surface of the reinforced glass to the interior of the reinforced glass. The compressive stress curve obtains the second fitting curve having one inflection point after fitting by using Orihara Pmc software. The absolute value of the curve slope on the left side of all the inflection points on the second fitting curve is greater than the absolute value of the curve slope on the right side of all the inflection points on the second fitting curve. Referring FIG. 14, the inflection point has a coordinate value of (x, y)=(100, 100).

Figure 14:
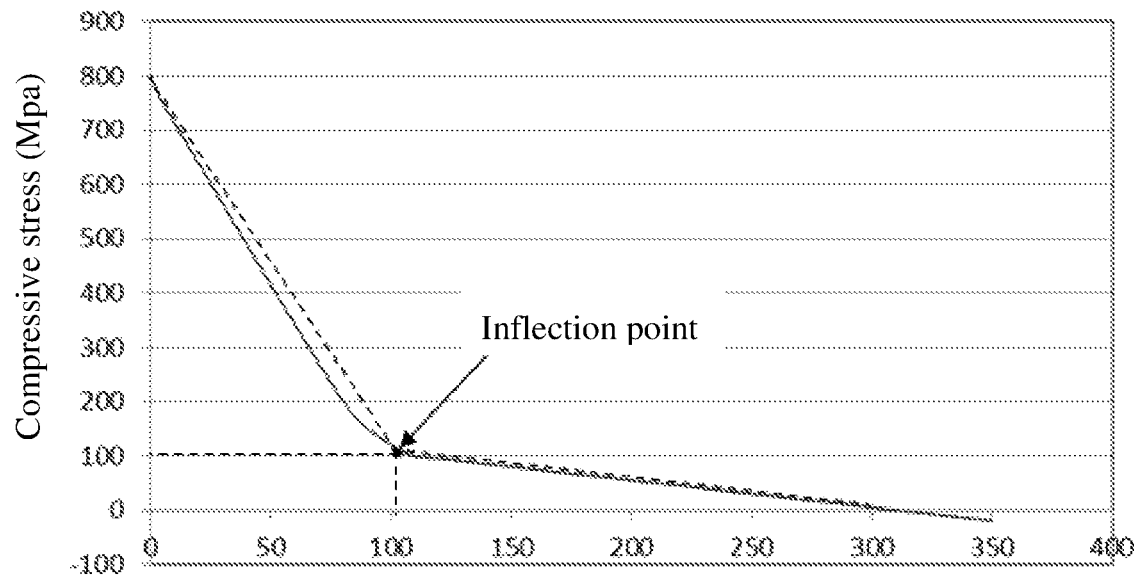
FIG. 14 shows the second fitting curve of the reinforced glass obtained in embodiment 3-7.

Moreover, according to the curve shown in FIG. 14, through the integral calculation method given below, it can be known that the definite integral of the second fitting curve shown in FIG. 14 in the range where the composite compressive stress layer locates (that is, the range [0, 300]) is less than or equal to 55 kN/m.

Integral Calculation Method

Linear fitting (as shown in the dotted line in FIG. 14) is made between the three points of the maximum compression stress, the inflection point and the maximum compression stress depth to calculate the definite integral of the second fitting curve in the interval [0, 300]. The definite integral of the second fitting curve in the interval [0, 300] is recorded as M (3-7). It is known that the point coordinate of the maximum compression stress is (0, 800), the point coordinate of the maximum compression stress depth is (300, 0) and the point coordinate of the inflection point is (x, y), then substituting x=30, y=100 into the following formula:

$$M(3\text{-}7)=x\times y+x\times(800-y)\times 0.5+y\times(300-x)\times 0.5.$$

Then, M (3-7)=55 kN/m is obtained.

Discussion of the Mother Glass

The applicant has also carried out the ion exchange for a series of mother glass with different thicknesses and obtained the corresponding reinforced glasses. The ion exchange method adopted is the above-mentioned preparation method one of the strengthened glass, wherein the thicknesses of the mother glass and the relevant data of the corresponding reinforced glass obtained are as follows.

| Relevant data of the mother glass | Relevant data of the corresponding reinforced glass | | | | |
|---|---|---|---|---|---|
| Glass thickness (mm) | Tensile stress minimum value $CT_{min}$(MPa) | Tensile stress maximum value $CT_{max}$(MPa) | Range absolute value of a total tensile stress (kN/m) | Minimum tensile stress stored in each unit volume (MN/m$^3$) | Maximum tensile stress stored in each unit volume (MN/m$^3$) |
| 0.4 | 40 | 116.55 | 27.56 | 100000.00 | 291375.00 |
| 0.45 | 40 | 110.78 | 28.66 | 88888.89 | 246166.67 |
| 0.5 | 40 | 105.00 | 29.25 | 80000.00 | 210000.00 |
| 0.55 | 40 | 99.75 | 29.58 | 72727.27 | 181363.64 |
| 0.6 | 40 | 95.55 | 30.00 | 66666.67 | 159250.00 |
| 0.65 | 40 | 91.35 | 30.04 | 61538.46 | 140538.46 |
| 0.7 | 40 | 88.20 | 30.37 | 57142.86 | 126000.00 |
| 0.75 | 40 | 86.10 | 31.12 | 53333.33 | 114800.00 |
| 0.8 | 40 | 81.90 | 30.17 | 50000.00 | 102375.00 |
| 0.85 | 40 | 79.80 | 30.45 | 47058.82 | 93882.35 |
| 0.9 | 40 | 77.70 | 30.54 | 44444.44 | 86333.33 |
| 0.95 | 40 | 75.60 | 30.44 | 42105.26 | 79578.95 |
| 1 | 40 | 73.50 | 30.15 | 40000.00 | 73500.00 |
| 1.05 | 40 | 71.93 | 30.17 | 38095.24 | 68500.00 |
| 1.1 | 40 | 70.35 | 30.05 | 36363.64 | 63954.55 |
| 1.15 | 40 | 68.78 | 29.78 | 34782.61 | 59804.35 |
| 1.2 | 40 | 67.20 | 29.38 | 33333.33 | 56000.00 |
| 1.25 | 40 | 66.40 | 29.70 | 32000.00 | 53117.22 |
| 1.3 | 40 | 65.57 | 29.92 | 30769.23 | 50438.66 |
| 1.35 | 40 | 65.47 | 30.95 | 29629.63 | 48498.81 |
| 1.4 | 40 | 65.37 | 31.96 | 28571.43 | 46691.45 |
| 1.45 | 40 | 65.25 | 32.96 | 27586.21 | 45002.77 |
| 1.5 | 40 | 65.13 | 33.93 | 26666.67 | 43420.79 |
| 1.55 | 40 | 65.00 | 34.87 | 25806.45 | 41935.08 |
| 1.6 | 40 | 64.86 | 35.80 | 25000.00 | 40536.51 |
| 1.65 | 40 | 64.71 | 36.69 | 24242.42 | 39217.05 |
| 1.7 | 40 | 64.55 | 37.56 | 23529.41 | 37969.62 |
| 1.75 | 40 | 64.38 | 38.40 | 22857.14 | 36787.95 |
| 1.8 | 40 | 64.20 | 39.20 | 22222.22 | 35666.46 |
| 1.85 | 40 | 64.01 | 39.98 | 21621.62 | 34600.18 |
| 1.9 | 40 | 63.81 | 40.72 | 21052.63 | 33584.64 |
| 1.95 | 40 | 63.60 | 41.42 | 20512.82 | 32615.85 |
| 2 | 40 | 63.38 | 42.08 | 20000.00 | 31690.21 |

Figure 15:
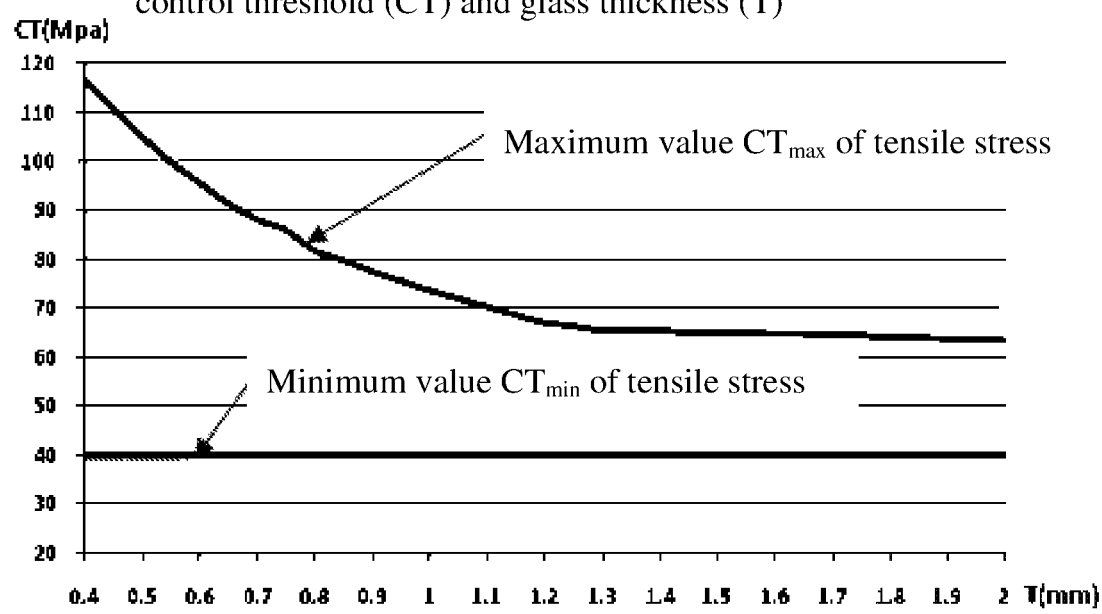
FIG. 15 is a curve relationship graph between the thickness of the mother glass and the tensile stress minimum value $CT_{min}$ and the tensile stress maximum value $CT_{max}$ of the reinforced glass.

The glass thickness, the tensile stress minimum value $CT_{min}$ (that is, the average tensile stress control minimum value), and the tensile stress maximum value $CT_{max}$ (that is, the average tensile stress control maximum value) all can be measured by corresponding instruments. It should be explained that for the same mother glass, different ion exchange processes can produce different compressive stress distributions, and the corresponding tensile stress distributions are also different. The tensile stress distribution is closely related to the safety (self-explosion) of the glass itself. Therefore, the internal tensile stress should be controlled. The internal stress has its distribution, so have its maximum value and average value. Generally, we just look at the average value. Therefore, when the thicknesses of the mother glass are different, it is necessary to define the average value of the maximum tensile stress and minimum tensile stress. According to the minimum value $CT_{min}$ and the maximum value $CT_{max}$ of the tensile stress of the mother glass with different thickness measured in the above table, the curve relationship between the thickness of the mother glass and the minimum value $CT_{min}$ of the tensile stress of the mother glass, as well as the curve relationship between the thickness of the mother glass and the maximum value $CT_{max}$ of the tensile stress of the mother glass can be obtained (referring FIG. 15).

In additional, the range absolute value of the total tensile stress can be calculated as follows:

(Tensile stress maximum value $CT_{max}$–Tensile stress minimum value $CT_{min}$)*(Glass thickness–2*Depth of Compressive stress layer DOL)

The depth of compressive stress layer DOL can be measured by using Orihara Scattered Light Photoelastic Stress Meter (SLP-1000).

The minimum tensile stress stored in each unit volume can be calculated as follows:

Tensile stress minimum value $CT_{min}$/Glass thickness.

The maximum tensile stress stored in each unit volume can be calculated as follows:

Tensile stress maximum value $CT_{max}$/Glass thickness.

Accordingly, the range absolute value of a total tensile stress that can be accommodated in the different tensile stress layers formed in the mother glass after the ion exchanges under different conditions is less than or equal to 42.08 kN/m and increases with the increase of the glass thickness. According to the principle of energy conservation, the sum of the compressive stress and the tensile stress of the mother glass formed after the ion exchange is equal, so the range of the sum of the compressive stress in the different layers of the mother glass formed after the ion exchange under different conditions is also less than or equal to 42.08 kN/m, and increases with the increase of the thickness of the mother glass. And the tensile stress stored in the unit volume of the strengthened glass obtained by the chemical strengthening of the mother glass is 20000-291375 mn/m³.

The foregoing is a further detailed description of the present application in connection with specific preferred embodiments, and cannot be considered as that the specific implementation of the present application is limited to these illustrations. It will be apparent to those skilled in the art that any various modifications or substitutions may be made to the present application without departing from the spirit of the invention, and such modifications or substitutions should be considered as falling within the scope of the present application.

The invention claimed is:

1. A reinforced glass which can bear a fracture energy larger than or equal to 74.67 joules per square meter (J/m²) when the reinforced glass is impacted and broken by an external force, and can bear a free fall fracture energy larger than or equal to 14.7 joules per kilogram (J/kg) under a certain negative pressure; wherein the reinforced glass is formed by a mother glass after a single time or multiple times of chemical strengthening, and the reinforced glass has a composite compressive stress layer on its surface;

wherein the composite compressive stress layer comprises a first ion which enters into the reinforced glass through a single time or multiple times of ion exchanges and is selected from an ion group of Na ion, K ion, Ru ion and CS ion, wherein a concentration of the first ion decreases nonlinearly from the surface of the reinforced glass to an interior of the reinforced glass; wherein a first fitting curve about the concentration of the first ion vs. a distance extending from the surface of the reinforced glass to the interior of the reinforced glass has at least one inflection point, wherein an absolute value of a curve slope on a left side of all the inflection points on the first fitting curve is greater than an absolute value of the curve slope on a right side of all the inflection points on the first fitting curve;

wherein a compressive stress of the composite compressive stress layer decreases nonlinearly from the surface of the reinforced glass to the interior of the reinforced glass, and the composite compressive stress layer has a compressive stress curve extending from the surface of the reinforced glass to the interior of the reinforced glass, wherein a second fitting curve having at least one inflection point is obtained from the compressive stress curve by using Orihara Pmc software; wherein an absolute value of a curve slope on a left side of all the inflection points on the second fitting curve is greater than an absolute value of the curve slope on a right side of all the inflection points on the second fitting curve;

wherein the compressive stress of the composite compressive stress layer has a maximum range between 600 MPa and 1100 MPa, and the composite compressive stress layer has a depth between 100 μm and 300 μm;

wherein the reinforced glass further has a tensile stress layer having a maximum tensile stress range between 42 MPa and 84 MPa, and the tensile stress stored in each unit volume of the reinforced glass is 20000-126000 MN/m³;

the reinforced glass has a thickness between 0.70 mm and 2.0 mm;

a ratio between an absolute value of a difference between sizes of the mother glass and the reinforced glass in a same dimension, and a size of the mother glass in the corresponding dimension is between 0.05% and 0.15%;

the reinforced glass formed by the mother glass after the ion exchanges under different conditions has different tensile stress layers, a range absolute value of a total tensile stress that can be accommodated in the reinforced glass is less than or equal to 42.08 kN/m and increases with the increase of the glass thickness;

wherein the mother glass has a thickness range of 0.4 mm-2.0 mm, a transmittance range for a 550 nm-wavelength light of 86%-92.2%, a refractive index range of 1.52-1.54, and an alkali metal oxide molar content range of 12 mol %-19 mol %, wherein in the mother glass, a Na oxide molar content is 11.0 mol %-12 mol %, an Al oxide molar content is 11 mol %~15.5 mol %;

wherein in the mother glass, a Li oxide molar content is not higher than 7.7 mol %; wherein the Si oxide molar content is 58.00%-62.50%;

wherein in the mother glass, a ratio range between the Al oxide molar content and a sum of the Na oxide molar content and the Li oxide molar content is 0.82~1.00;

wherein during the ion exchange process, an ion exchange layer depth of the mother glass increases with an extension of an ion exchange time, wherein a compression stress layer formed by the mother glass after the ion exchange has a maximum limit depth which increases with an increase of a thickness of the mother glass and has a maximum value of 300 μm.

2. The reinforced glass according to claim 1, wherein a definite integral of the second fitting curve in a range where the composite compressive stress layer locates is less than or equal to 55 kN/m.

3. The reinforced glass according to claim 1, wherein the composite compressive stress layer further comprises a second ion which enters into the reinforced glass through a single time or multiple times of ion exchanges; wherein a concentration of the second ion increases nonlinearly and then decreases nonlinearly from the surface of the reinforced glass to an interior of the reinforced glass.

4. The reinforced glass according to claim 3, wherein the second ion is selected from an ion group of Na ion, K ion, Ru ion and CS ion; wherein a same second ion exists in the mother glass, and a maximum depth of the second ion entering into the reinforced glass is greater than the depth of the composite compressive stress layer.

5. The reinforced glass according to claim 4, wherein the first ion and the second ion are K ion and Na ion respectively.

6. The reinforced glass according to claim 4, wherein the first ion and the second ion enter into the reinforced glass from the same salt bath during a single time of chemical strengthening.

7. The reinforced glass according to claim 4, wherein the first ion and the second ion are K ions, and the mother glass contains Na oxide and Al oxide.

8. The reinforced glass according to claim 1, wherein a range absolute value of a total tensile stress that can be accommodated in the reinforced glass is more than or equal to 30.37 kN/m and less than or equal to 42.08 kN/m and increases with the increase of the glass thickness.

9. The reinforced glass according to claim 1, wherein in the mother glass, an alkali metal oxide molar content range of 13 mol %-19 mol %, a Na oxide molar content is 11.0 mol %-11.3 mol %; wherein the Si oxide molar content is 58.00%-62%.

10. The reinforced glass according to claim 1, wherein the compressive stress of the composite compressive stress layer has a maximum range between 950 MPa and 1100 MPa, and the composite compressive stress layer has a depth between 130 μm and 300 μm; wherein the reinforced glass further has a tensile stress layer having a maximum tensile stress range between 42 MPa and 67 MPa.

11. The reinforced glass according to claim 1, wherein in the mother glass, a ratio range between a sum of the Al oxide molar content and a Mg oxide molar content, and a sum of the Na oxide molar content and the Li oxide molar content is 0.82~1.95.

12. The reinforced glass according to claim 1, wherein in the mother glass, a ratio range between a sum of the Al oxide molar content, the Mg oxide molar content, the B oxide molar content and the P oxide molar content, and a sum of the Na oxide molar content and the Li oxide molar content is 0.95~1.95.

13. The reinforced glass according to claim 1, wherein in the mother glass, a ratio range between a sum of the Al oxide molar content, the Mg oxide molar content, the B oxide molar content, the P oxide molar content and the Si oxide molar content, and a sum of the Na oxide molar content and the Li oxide molar content is 4.21~7.45.

14. The reinforced glass according to claim 1, wherein a ratio between an absolute value of a difference between sizes of the mother glass and the reinforced glass in a same dimension, and a size of the mother glass in the corresponding dimension is between 0.05% and 0.09%.

15. The reinforced glass according to claim 1, wherein a ratio between an absolute value of a difference between sizes of the mother glass and the reinforced glass in a same dimension, and a size of the mother glass in the corresponding dimension is between 0.08% and 0.09%.

16. The reinforced glass according to claim 1, wherein in the mother glass, a Si oxide molar content is 62.00%; an Al oxide molar content is 15.5 mol %; a P oxide molar content is 2.5 mol %; a Li oxide molar content is 7.7 mol %; a Zn oxide molar content is 1 mol %; a Na oxide molar content is 11.3 mol %.

17. The reinforced glass according to claim 1, wherein in the mother glass, a Si oxide molar content is 60.50%; an Al oxide molar content is 11 mol %; a Mg oxide molar content is 10.5 mol %; a Ca oxide molar content is 0.8 mol %; a Ti oxide molar content is 4.2 mol %; a Na oxide molar content is 11 mol %; a K oxide molar content is 2 mol %.

18. The reinforced glass according to claim 1, wherein the mother glass, can bear a free fall fracture energy larger than or equal to 15.68 joules per kilogram (J/kg) under a certain negative pressure.

19. The reinforced glass according to claim 1, wherein the mother glass, can bear a free fall fracture energy larger than or equal to 17.64 joules per kilogram (J/kg) under a certain negative pressure.

* * * * *